US012641058B2

(12) United States Patent　　　　(10) Patent No.:　US 12,641,058 B2
　　Zhang et al.　　　　　　　　　　(45) Date of Patent:　May 26, 2026

(54) INFORMATION PROCESSING METHOD AND APPARATUS, AND COMMUNICATION DEVICE

(71) Applicant: VIVO MOBILE COMMUNICATION CO., LTD., Guangdong (CN)

(72) Inventors: Pengfei Zhang, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 158 days.

(21) Appl. No.: 18/478,544

(22) Filed: Sep. 29, 2023

(65) Prior Publication Data

US 2024/0031335 A1　　Jan. 25, 2024

Related U.S. Application Data

(63) Continuation of application No. PCT/CN2022/085311, filed on Apr. 6, 2022.

(30) Foreign Application Priority Data

Apr. 6, 2021　　(CN) .......................... 202110369534.1

(51) Int. Cl.
　　*H04L 9/40*　　　　(2022.01)
　　*H04L 61/4511*　　(2022.01)
　　*H04L 101/618*　　(2022.01)
(52) U.S. Cl.
　　CPC ...... *H04L 63/0236* (2013.01); *H04L 61/4511* (2022.05); *H04L 2101/618* (2022.05)
(58) Field of Classification Search
　　CPC ............. H04L 63/0236; H04L 61/4511; H04L 2101/618; H04L 63/20; H04W 48/14
　　See application file for complete search history.

(56) References Cited

U.S. PATENT DOCUMENTS 8,739,243 B1　5/2014　Martini
2017/0171206 A1* 6/2017　Joffe ...................... H04L 63/10
(Continued)

FOREIGN PATENT DOCUMENTS

CN　　108712516 A　10/2018
CN　　111385369 A　7/2020
(Continued)

OTHER PUBLICATIONS

Extended European Search Report for Application No. 22784047.7, dated Sep. 10, 2024, 16 Pages.
(Continued)

*Primary Examiner* — Jimmy H Tran
(74) *Attorney, Agent, or Firm* — BROOKS KUSHMAN P.C.

(57) ABSTRACT

An information processing method and apparatus, and a communication device. The information processing method includes: acquiring first information, wherein the first information includes at least one of the following: domain name server address information and configuration server address information; and executing a first operation according to the first information, wherein the first operation includes: determining first policy information and/or sending the first information or the first policy information for determining a first rule for data processing; the first rule for data processing is used for performing data passing related control on first data and/or second data; the first data is related to a domain name server address and/or a configuration server address; and the second data is independent of the domain name server address and/or the configuration server address, and/or is not the first data.

20 Claims, 6 Drawing Sheets

Acquire first information, the first information including at least one of the following: domain name server address information and configuration server address information — 201

Execute a first operation according to the first information — 202

(56) References Cited

U.S. PATENT DOCUMENTS

| | | | |
|---|---|---|---|
| 2018/0041471 A1 | 2/2018 | Sudo et al. | |
| 2019/0191467 A1* | 6/2019 | Dao | H04W 76/11 |
| 2019/0379530 A1* | 12/2019 | Suthar | H04M 15/66 |
| 2019/0380031 A1* | 12/2019 | Suthar | H04M 15/8016 |
| 2020/0112907 A1* | 4/2020 | Dao | H04M 15/8016 |
| 2020/0154390 A1* | 5/2020 | Kim | H04W 8/26 |
| 2020/0329008 A1 | 10/2020 | Dao | |
| 2020/0412559 A1* | 12/2020 | Tang | H04W 8/18 |
| 2021/0320896 A1 | 10/2021 | Feng | |
| 2021/0368556 A1* | 11/2021 | Kedalagudde | H04W 48/16 |
| 2022/0150693 A1* | 5/2022 | Kim | H04W 12/033 |
| 2022/0174032 A1* | 6/2022 | Zhu | H04L 45/121 |
| 2022/0191100 A1 | 6/2022 | Kim et al. | |
| 2022/0191693 A1* | 6/2022 | Sullivan | H04L 9/0822 |
| 2022/0345442 A1* | 10/2022 | Lee | H04L 67/10 |
| 2023/0087052 A1* | 3/2023 | Korja | H04L 63/0263 |
| | | | 709/245 |
| 2023/0239958 A1 | 7/2023 | Li et al. | |
| 2023/0362127 A1* | 11/2023 | Korja | H04L 61/4511 |
| 2023/0363011 A1* | 11/2023 | Fu | H04W 74/0833 |
| 2023/0379293 A1* | 11/2023 | Muñoz De La Torre Alonso | H04L 61/2557 |
| 2023/0379806 A1* | 11/2023 | Ke | H04W 12/06 |
| 2024/0022540 A1* | 1/2024 | Ke | H04L 61/4511 |

FOREIGN PATENT DOCUMENTS

| | | |
|---|---|---|
| CN | 112422701 A | 2/2021 |
| CN | 112583880 A | 3/2021 |
| CN | 112654100 A | 4/2021 |
| WO | 2016080446 A1 | 5/2016 |
| WO | 2020197288 A1 | 10/2020 |
| WO | 2021032118 A1 | 2/2021 |

OTHER PUBLICATIONS

Ericsson "User Plane based solution to onboarding KI#4" 3GPP TSG-SA WG2 Meeting #136AH, Incheon, Korea, Jan. 2020, S2-2000192, 7 Pages.

Vivo, et al., "UE configuration for remote provisioning" 3GPP TSG-WG SA2 Meeting #145E e-meeting, Elbonia, May 2021, S2-2104546, 3 Pages.

Ericsson, et al., "Rapporteur's editorial cleanup for eNPN" 3GPP TSG-WG SA2 Meeting #147E, E-meeting, Oct. 2021, S2-2108090, 10 Pages.

First Office Action for Japanese Application No. 2023-559815, dated Aug. 30, 2024, 8 Pages.

ZTE "KI#4-T3, Enabling restricted PDU Session for remote provisioning of UE using User Plane" SA WG2 Meeting #S2-143E, Electronic, Elbonia, Feb. 2021, S2-2100611, 5 Pages.

Second Office Action for Japanese Application No. 2023-559815, dated Feb. 28, 2025, 10 Pages.

First Office Action for Chinese Application No. 202110369534.1, dated Aug. 8, 2023, 9 Pages.

International Search Report and Written Opinion for Application No. PCT /CN2022/085311, dated Jul. 4, 2022, 10 Pages.

Nokia et al. "Enabling restricted PDU Session for remote provisioning of UE via User Plane" SA WG2 Meeting #143e, Elbonia, Mar. 2021, S2-2101086, 3 Pages.

Nokia et al. "Enabling restricted PDU Session for remote provisioning of UE via User Plane" SA WG2 Meeting #144e, Elbonia, Apr. 2021, S2-2102840, 3 Pages.

* cited by examiner

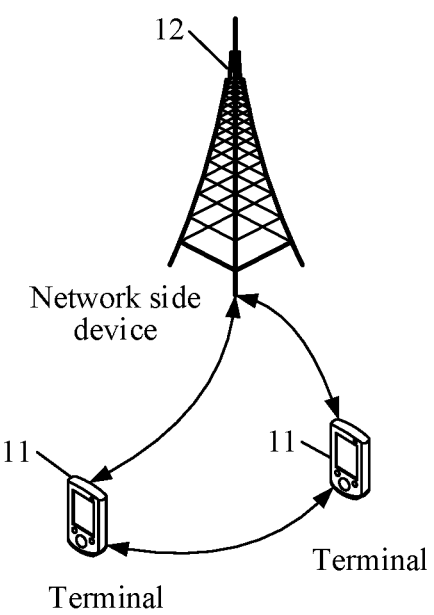

Network side
device

11

11

Terminal

Terminal

FIG. 1

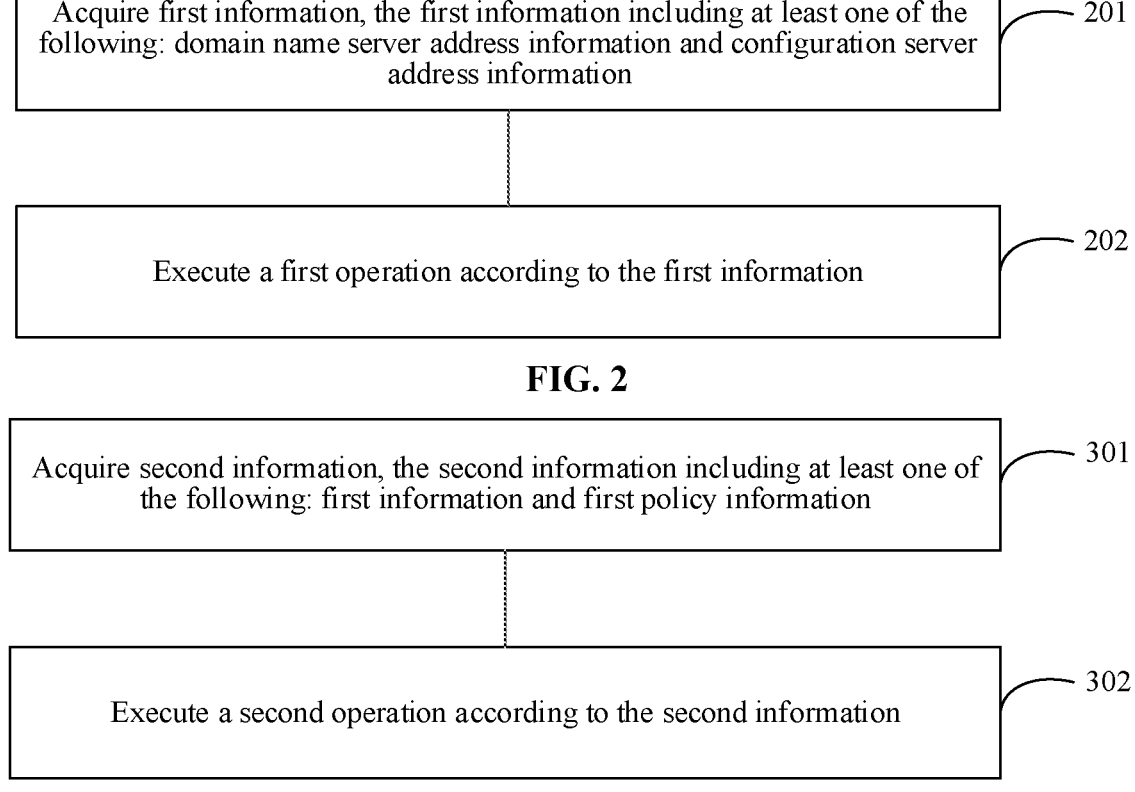

Acquire first information, the first information including at least one of the following: domain name server address information and configuration server address information — 201

Execute a first operation according to the first information — 202

FIG. 2

Acquire second information, the second information including at least one of the following: first information and first policy information — 301

Execute a second operation according to the second information — 302

FIG. 3

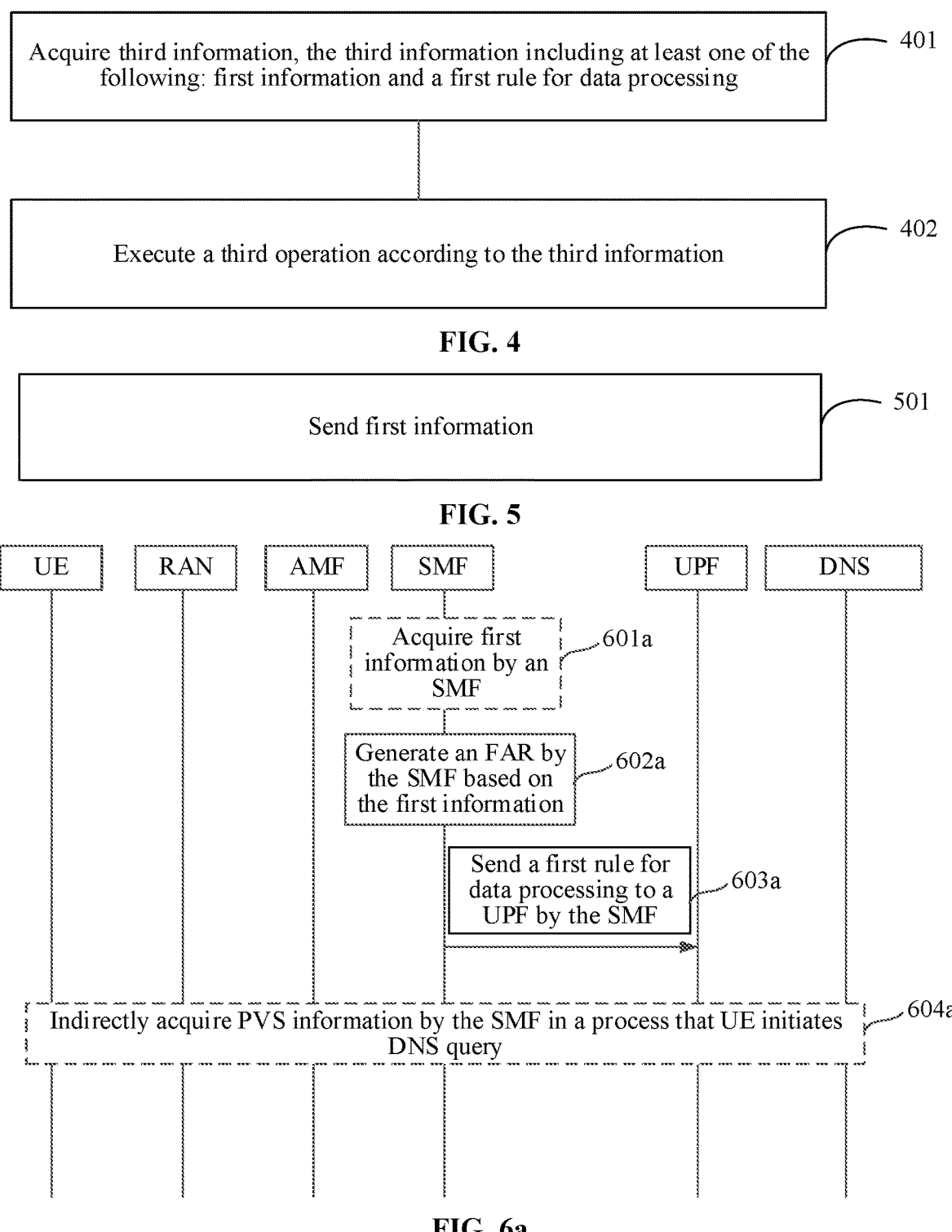

Acquire third information, the third information including at least one of the following: first information and a first rule for data processing — 401

Execute a third operation according to the third information — 402

FIG. 4

Send first information — 501

FIG. 5

| UE | RAN | AMF | SMF | | UPF | DNS |

Acquire first information by an SMF — 601a

Generate an FAR by the SMF based on the first information — 602a

Send a first rule for data processing to a UPF by the SMF — 603a

Indirectly acquire PVS information by the SMF in a process that UE initiates DNS query — 604a

INFORMATION PROCESSING METHOD AND APPARATUS, AND COMMUNICATION DEVICE

CROSS-REFERENCE TO RELATED APPLICATIONS

This application is a continuation of PCT International Application No. PCT/CN2022/085311 filed on Apr. 6, 2022, which claims priority to Chinese Patent Application No. 202110369534.1 filed on Apr. 6, 2021, which are incorporated herein by reference in their entireties.

TECHNICAL FIELD

This application relates to the technical field of communications, in particular to an information processing method and apparatus, and a communication device.

BACKGROUND

In a case that user equipment (UE) only establishes a restricted data channel, if the UE needs to query DNS domain name information from a domain name server (DNS), DNS query data sent by the UE to the DNS will be discarded.

SUMMARY

In a first aspect, an information processing method is provided, used for a first communication device, and including:

acquiring first information, the first information including at least one of the following: domain name server address information and configuration server address information; and executing a first operation according to the first information, the first operation including at least one of the following:

determining first policy information; and sending the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

In a second aspect, a first communication device is provided, including:

a first acquiring module, configured to acquire first information, the first information including at least one of the following: domain name server address information and configuration server address information; and a first executing module, configured to execute a first operation according to the first information, the first operation including at least one of the following:

determining first policy information; and sending the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

In a third aspect, an information processing method is provided, used for a second communication device, and including:

acquiring second information, the second information including at least one of the following: first information and first policy information; and executing a second operation according to the second information, the second operation including at least one of the following:

determining a first rule for data processing; and sending the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In a fourth aspect, a second communication device is provided, including:

a second acquiring module, configured to acquire second information, the second information including at least one of the following: first information and first policy information; and a second executing module, configured to execute a second operation according to the second information, the second operation including at least one of the following:

determining a first rule for data processing; and sending the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In a fifth aspect, an information processing method is provided, used for a third communication device, and including:

acquiring third information, the third information including at least one of the following: first information and a first rule for data processing; and executing a third operation according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In a sixth aspect, a third communication device is provided, including:

a third acquiring module, configured to acquire third information, the third information including at least one of the following: first information and a first rule for data processing; and a third executing module, configured to execute a third operation according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In a seventh aspect, an information processing method is provided, used for a fourth communication device, and including:

sending first information, the first information including at least one of the following: domain name server address information, and configuration server address information.

In an eighth aspect, a fourth communication device is provided, including:

a fourth sending module, configured to send first information, the first information including at least one of the following: domain name server address information, and configuration server address information.

In a ninth aspect, a network side device is provided, including a processor, a memory, and a program or instruction stored on the memory and capable of being run on the processor, the program or instruction, when executed by the processor, implementing steps of the method described in the first aspect, or the program or instruction, when executed by the processor, implementing steps of the method described in the third aspect, or the program or instruction, when executed by the processor, implementing steps of the method described in the fifth aspect.

In a tenth aspect, a network side device is provided, including a processor and a communication interface.

The communication interface is configured to acquire first information, and the first information includes at least one of the following: domain name server address information and configuration server address information; and the processor is configured to execute a first operation according to the first information, the first operation including at least one of the following:

determining first policy information; and controlling the communication interface to send the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

Alternatively, the communication interface is configured to acquire second information, and the second information includes at least one of the following: first information and first policy information; and the processor is configured to execute a second operation according to the second information, the second operation including at least one of the following:

determining a first rule for data processing; and controlling the communication interface to send the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

Alternatively, the communication interface is configured to acquire third information, and the third information includes at least one of the following: first information and a first rule for data processing; and the processor is configured to execute a third operation according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In an eleventh aspect, a terminal is provided, including a processor, a memory, and a program or instruction stored on the memory and capable of being run on the processor, the program or instruction, when executed by the processor, implementing steps of the method described in the seventh aspect.

In a twelfth aspect, a terminal is provided, including a processor and a communication interface.

The communication interface is configured to send first information, the first information including at least one of the following: domain name server address information, and configuration server address information.

According to a thirteenth aspect, a configuration method is provided, including:

sending, by a session management function (SMF), a data processing rule or rule parameters used for forming the data processing rule, the data processing rule being at least used for executing a data passing control operation on data related to domain name query and/or data related to remote configuration in a remote configuration process.

In a fourteenth aspect, a configuration method is provided, including:

sending, by a policy control function (PCF), rule parameters used for forming a data processing rule or a policy carrying the rule parameters, the data processing rule being at least used for executing a data passing control operation on data related to domain name query and/or data related to remote configuration in a remote configuration process.

In a fifteenth aspect, a data control method is provided, including:

at least executing, by a user plane function (UPF), a data passing control operation on data related to domain name query and/or data related to remote configuration in a remote configuration process.

In a sixteenth aspect, a readable storage medium is provided, storing a program or instruction, the program or instruction, when executed by a processor, implementing steps of the method described in the first aspect, or implementing steps of the method described in the third aspect, or implementing steps of the method described in the fifth aspect, or implementing steps of the method described in the seventh aspect, or implementing steps of the method described in the thirteenth aspect, or implementing steps of the method described in the fourteenth aspect, or implementing steps of the method described in the fifteenth aspect.

In a seventeenth aspect, a chip is provided, including a processor and a communication interface, the communication interface being coupled with the processor, the processor being configured to run a program or instruction to implement the method described in the first aspect, or implement the method described in the third aspect, or implement the method described in the fifth aspect, or implement the method described in the seventh aspect, or implement the method described in the thirteenth aspect, or implement the method described in the fourteenth aspect, or implement the method described in the fifteenth aspect.

In an eighteenth aspect, a computer program/program product is provided, stored in a non-volatile storage medium, the program/program product being executed by at least one processor so as to implement steps of the information processing method described in the first aspect, or implement steps of the configuration method described in the third aspect, or implement steps of the information processing method described in the fifth aspect, or implement steps of the information processing method described in the seventh aspect, or implement steps of the information processing method described in the thirteenth aspect, or implement steps of the configuration method described in the fourteenth aspect, or implement steps of the data control method described in the fifteenth aspect.

BRIEF DESCRIPTION OF THE DRAWINGS

FIG. 1 is a block diagram of a wireless communication system to which an embodiment of this application is applicable;

FIG. 2 is a flowchart of an information processing method provided in an embodiment of this application;

FIG. 3 is a flowchart of another information processing method provided in an embodiment of this application;

FIG. 4 is a flowchart of yet another information processing method provided in an embodiment of this application;

FIG. 5 is a flowchart of still another information processing method provided in an embodiment of this application;

FIG. 6a is a schematic diagram of data interaction of an SMF in a first application scenario;

DETAILED DESCRIPTION

Figure 6B:
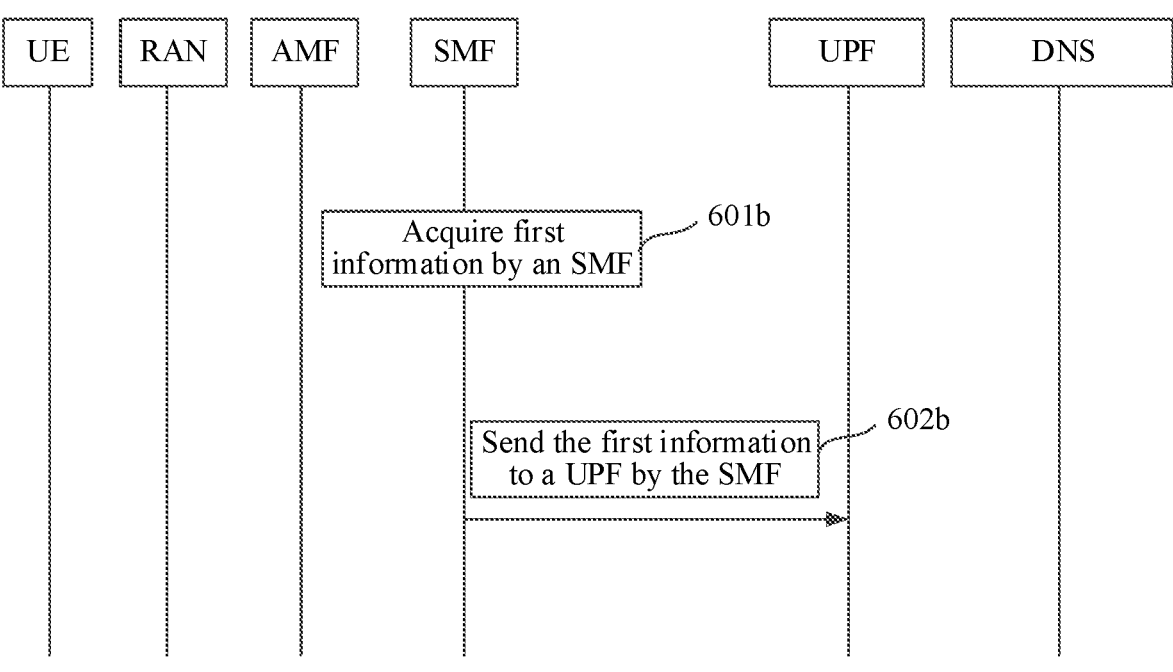
FIG. 6b is a schematic diagram of data interaction of an SMF in a second application scenario.

The technical solutions in embodiments of this application will be clearly described in the following with reference to the accompanying drawings in the embodiments of this application. Apparently, the described embodiments are some rather than all of the embodiments of this application. All other embodiments obtained by a person skilled in the art based on the embodiments in this application fall within the protection scope of this application.

Terms "first", "second" and the like in the specification and claims of this application are used for distinguishing similar objects, but are not used for describing a specific sequence or precedence order. It is to be understood that the terms used in this way are exchangeable in a proper case, so that the embodiments of this application described can be implemented in an order different from the order shown or described herein. Moreover, the objects distinguished by "first" and "second" are usually of the same class, and the number of objects is not limited. For example, a first object may be one or more. In addition, "and/or" in the specification and the claims represents at least one of the connected objects. A character "/" generally represents that the previous and next association objects are in an "or" relationship.

It is worth pointing out that technologies described in the embodiments of this application are not limited to a long term evolution (LTE) LTE/LTE-advanced (LTE-A) system, and may further be applied to other wireless communication systems such as a code division multiple access (CDMA), a time division multiple access (TDMA), a frequency division multiple access (FDMA), an orthogonal frequency division multiple access (OFDMA), a single-carrier frequency-division multiple access (SC-FDMA), and other systems. Terms "system" and "network" described in the embodiments of this application are often interchangeably used, and the described technology can be used not only for the systems and radio technologies mentioned above, but also for other systems and radio technologies. The following description describes a new radio (NR) system for an example purpose, and the term NR is used in most of the following descriptions. However, these technologies can also be applied to applications other than an NR system application, such as a $6^{th}$ generation (6G) communication system.

In order to facilitate better understanding of the embodiments of this application, the following technical points will be introduced first.

A terminal accesses a network (Onboarding network) through a first access mode (such as Onboarding), and the first access mode (such as Onboarding) includes at least one of the following: an access mode of accessing a first network for downloading a certificate for accessing a second network, an access mode of accessing the first network without a certificate that can access the first network, and an access mode that can only use a restricted service, a certificate for the terminal accessing the first network being a default certificate.

The first network and the second network may be the same network or different networks.

Remote provisioning (also known as remote configuration) refers to that the terminal acquires a certificate or subscription or other information of a target stand-alone non-public network (SNPN) or a public network integrated non-public network by accessing a current network (Onboarding network).

At present, after completing the first access mode, the terminal may use a user plane solution for remote provisioning, that is, a restricted data channel is established and dedicated to remotely providing UE with the subscription information. The subscription information is not only used for primary authentication, but also for secondary authentication, network slice-specific authentication and authorization (NSSAA), etc.

After the establishment of the restricted data channel, the UE may still not have a provisioning server address. Therefore, the UE needs to use a fully qualified domain name (FQDN) for provisioning server address discovery. When the UE uses the FQDN for provisioning server address discovery, it needs to send a DNS query request to a DNS to acquire the provisioning server address.

The issue about how to allow DNS query data to pass through the restricted data channel needs to be solved.

It can be seen from the above that when the UE performs remote configuration, if the UE does not obtain the provisioning server address after establishing a restricted protocol data unit (PDU) session, the UE needs to use the FQDN for provisioning server address discovery. Then the UE needs to execute DNS query, as the UE only establishes the restricted PDU session, the DNS query data issued by the UE will be discarded, resulting in DNS query failure.

This embodiment of this application can solve the above technical problem through the following implementations:

in one implementation, the UE sends first information to an SMF, the first information contains a DNS address and/or a provisioning server (Provisioning Server, PVS) address, and the SMF generates policy information (such as a packet detection rule (Packet Detection Rule, PDR) and/or a forwarding action rule (FAR) corresponding to the PDR) according to the first information and sends the same to a UPF;

in another implementation, the SMF locally configures the first information, and the SMF generates a first rule for data processing (such as the PDR and/or the FAR corresponding to the PDR) according to the first information, and sends the same to the UPF;

in yet another implementation, the SMF receives first policy information from a PCF, and the SMF generates the first rule for data processing (such as the PDR and/or the FAR corresponding to the PDR) according to the first policy information, and sends the same to the UPF; and in still another implementation, the SMF sends the first information to the UPF.

Through the above implementations, the UPF executes an operation of restricting the passage of data, and the operation of restricting the passage of data includes at least one of the following: only allowing first data to pass through; and not allowing data other than the first data (second data) to pass through or discarding the same. A destination or source of the first data includes at least one of the following: the DNS, and the configuration server.

The configuration server includes: a server configuring a certificate and/or subscription information for the terminal; the certificate and/or subscription information may be at least one of the following: a certificate and/or subscription information used for accessing a first object, a certificate and/or subscription used for primary authentication and/or authorization, and a certificate and/or subscription information for non-primary authentication and/or authorization;

non primary authentication and/or authorization includes at least one of the following: secondary authentication and/or authorization, and slice-related secondary authentication and/or authorization; and the first object includes: a network slice, a domain name (DN), and a network.

The type of the network includes at least one of the following: an SNPN, a public network integrated NPN (PNI-NPN), and a public land mobile network (PLMN).

A destination address or source address of the first data includes at least one of the following: DNS address information, and configuration server address information.

The second data includes at least one of the following: data independent of a domain name server address, data independent of a configuration server address, and/or non-first data.

It is to be noted that, executing an operation of allowing the first data to pass through and/or executing an operation of not allowing the second data to pass through include/includes at least one of the following operations:

only allowing data related to domain name query and data related to provisioning server query to pass through;

not allowing data other than the data related to the domain name query and the data related to the provisioning server query to pass through; and discarding the data other than the data related to the domain name query and the data related to the provisioning server query.

In one implementation, the data related to the domain name server address refers to data with a source address or destination address being the domain name server address;

in one implementation, the data related to the configuration server address refers to data with a source address or destination address being the configuration server address;

in one implementation, the data independent of the domain name server address refers to data with a source address or destination address being not the domain name server address;

in one implementation, the data independent of the configuration server address refers to data with a source address or destination address being not the configuration server address;

in one implementation, the configuration server includes at least one of the following: the PVS, and a subscription owner; and in one implementation, the first policy information includes a policy control and charging (PCC) rule, and a gateway status corresponding to the domain name server address or/and the configuration server address in the PCC rule is open or close.

In one implementation, the data detection rule includes the PDR.

In one implementation, a data forwarding rule includes the FAR. For example, two addresses of the FAR are set to pass through and the PDR may not be set for the second data. It is not difficult to understand that data without the corresponding PDR will be discarded. Therefore, according to the rule, the second data will be discarded.

In one implementation, an access mode of accessing a network for acquiring the certificate and/or the subscription includes: an access mode of accessing a network for remotely acquiring the certificate and/or the subscription.

In one implementation, the restricted data channel includes at least one of the following: a data channel that allows the first data to pass through, and a data channel that does not allow the second data to pass through.

In one implementation, the data channel includes a PDU session.

In one implementation, the first access mode contains Onboarding.

The first access mode (such as Onboarding) includes at least one of the following: an access mode of accessing a first network for downloading a certificate for accessing a second network, an access mode of accessing the first network without a certificate that can access the first network, and an access mode that can only use a restricted service, a certificate for the terminal accessing the first network being a default certificate. The first network and the second network may be the same network or different networks.

The first rule for data processing is at least related to address information of the domain name query server.

The first rule for data processing is further related to address information of a provisioning server, and is used for executing a data passing operation on data related to provisioning server query.

In one implementation, a second communication device (such as the SMF) receives the first information from a first communication device (such as the PCF), or locally configures to obtain the first information.

The configuration server includes: a server configuring a certificate and/or subscription information for the terminal; and the certificate and/or subscription information may be at least one of the following: a certificate and/or subscription information used for accessing a first object, a certificate and/or subscription used for primary authentication and/or authorization, and a certificate and/or subscription information for non-primary authentication and/or authorization.

Non primary authentication and/or authorization includes at least one of the following: secondary authentication and/or authorization, and slice-related secondary authentication and/or authorization; and the first object includes: a network slice, a DN, and a network.

The type of the network includes at least one of the following: an SNPN, a PNI-NPN and a PLMN.

The method, the apparatus, and the communication device provided by the embodiments of this application may be applied to the following network system, and the network system includes: a terminal, a network element of a radio access network (RAN), and a network element of a core network (CN).

In an embodiment of this application, the communication device may include at least one of the following: a communication network element device and a terminal.

In an embodiment of this application, a communication network element may include at least one of the following: a network element of a core network and a network element of a radio access network.

In an embodiment of this application, the network element of the core network may include, but is not limited to, at least one of the following: a core network device, a core network node, a core network function, the network element of the core network, a mobility management entity (MME), an access management function (AMF), a session management function (SMF), a user plane function (UPF), a service GW (SGW), a PDN gate way, a policy control function (PCF), a policy and charging rules function (PCRF), a general packet radio service (GPRS) serving support node (SGSN), a gateway GPRS support node (GGSN), a unified data management (UDM), a unified data repository (UDR), a home subscriber server (HSS), an application function (AF), and a centralized network configuration (CNC).

In an embodiment of this application, the network element of the radio access network may include, but is not limited to, at least one of the following: a radio access network device, a radio access network node, a radio access network function, a radio access network unit, a third generation partnership project (3GPP) radio access network, a non-3GPP radio access network, a centralized unit (CU), a distributed unit (DU), a base station, an evolved node B (eNB), a 5G base station (gNB), a radio network controller (RNC), a base station (NodeB), a non-3GPP inter working function (N3IWF), an access controller (AC) node, an access point (AP) device or a wireless local area networks (WLAN) node, and an N3IWF.

The base station may be a base transceiver station (BTS) in a global system for mobile communications (GSM) or a code division multiple access (CDMA) network, or may be a base station (NodeB) in wideband code division multiple access (WCDMA), or may be an evolved base station in LTE (such as: eNB or e-NodeB, evolutionary Node B, and a 5G base station (gNB), which is not limited by the embodiments of this application.

In this embodiment of this application, the terminal (such as UE) may include a relay that supports a terminal function and/or a terminal that supports a relay function. The terminal may also be referred to as a terminal device or a user terminal (UE), and the terminal may be a terminal side device such as a mobile phone, a tablet personal computer, a laptop computer, a personal digital assistant (PDA), a mobile Internet device (MID), a wearable device, or an on-board device. It is to be noted that, the specific type of the terminal is not limited in the embodiments of this application.

In an optional embodiment of this application, obtaining or acquiring may be understood as obtaining from configuration, receiving, receiving after a request, acquiring through self-learning, acquiring by deriving from unreceived information, or obtaining after processing received information, which may specifically be determined according to actual needs, and is not limited in the embodiments of this application.

In an optional embodiment of this application, sending may contain broadcasting, broadcasting in a system message, returning after responding to a request, and dedicated signaling sending.

The technical solutions in the embodiments of this application will be clearly described in the following with reference to the accompanying drawings in the embodiments of this application. Apparently, the described embodiments are some rather than all of the embodiments of this application. All other embodiments obtained by a person of ordinary skill in the art based on the embodiments of this application without making creative efforts shall fall within the protection scope of this application.

FIG. 1 shows a block diagram of a wireless communication system to which an embodiment of this application is applicable. The wireless communication system includes a terminal 11 and a network side device 12. The terminal 11 may also be referred to as a terminal device or a user terminal (UE). The terminal 11 may be a mobile phone, a tablet personal computer, a laptop computer or called a notebook computer, a personal digital assistant (PDA), a handheld computer, a Netbook, a ultra-mobile personal computer (MPC), a mobile Internet Device (MID), a wearable device or vehicle user equipment (VUE), pedestrian user equipment (PUE), and other terminal side devices. The wearable device includes: a smart watch, a bracelet, a headphone, glasses, etc. It is to be noted that, the specific type of the terminal 11 is not limited in the embodiments of this application. The network side device 12 may be a base station or a core network, where the base station may be referred to as a NodeB, an evolution NodeB, an access point, a base transceiver station (BTS), a radio base station, a radio transceiver, a basic service set (BSS), an extended service set (ESS), a B node, an evolution B node (eNB), a home B node, a home evolution B node, a WLAN access point, a WiFi node, a transmitting receiving point (TRP), or other certain suitable term in the field, and as long as the same technical effects are achieved, the base station is not limited to specific technical vocabulary. It is to be noted that, in this embodiment of this application, only the base station in the NR system is used as an example, but the specific type of the base station is not limited.

A configuration method, a data control method, apparatus, and a network side device provided by the embodiments of this application are illustrated below in detail through some embodiments and their application scenarios with reference to the accompanying drawings.

Please refer to FIG. 2, which is a flowchart of an information processing method provided in this embodiment of this application. An executing subject of the method is a first communication device, the first communication device may be a PCF, and as shown in FIG. 2, the method may include the following steps:

Step 201, first information is acquired, the first information including at least one of the following: domain name server address information and configuration server address information.

Step 202, a first operation is executed according to the first information, the first operation including at least one of the following:

determining first policy information; and sending the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

In one implementation, the first access mode contains Onboarding access.

In one implementation, the data related to the domain name server address refers to data with a source address or destination address being the domain name server address;

in one implementation, the data related to the configuration server address refers to data with a source address or destination address being the configuration server address;

in one implementation, the data independent of the domain name server address refers to data with a source address or destination address being not the domain name server address;

in one implementation, the data independent of the configuration server address refers to data with a source address or destination address being not the configuration server address; and in specific implementation, the above first communication device may be a policy control function (PCF), the above first information may be rule parameters used for forming the first rule for data processing, and the above first policy information may be a policy carrying the rule parameters.

In addition, the above non-first data may be understood as: data other than the first data mentioned. In specific implementation, data passing related control refers to an operation of controlling whether data passes through or not.

In an optional implementation, the above first policy information includes a policy control and charging (PCC) rule, which corresponds to two addresses: gate status=open, close.

In implementation, the PCF may send the above first information and/or first policy information to a session management function (SMF), and the above first policy information may be any policy that can be transmitted to the SMF, as long as it has sufficient fields to store the above rule parameters.

In specific implementation, taking the first data including the data related to the domain name server address as an example, the above SMF is used for sending the first rule for data processing or the rule parameters used for forming the first rule for data processing to a UPF, so that the UPF executes a data passing control operation on the data related to domain name query in a remote configuration process, thus UE can obtain correct DNS information from the domain name query server, and utilize the DNS information to achieve PVS discovery based on a fully qualified domain name (FQDN) in a case that only the restricted PDU session is established.

It is to be understood that this application may be specifically applied to any scenario where DNS query data is discarded in the UPF to achieve correct processing of DNS query data, for example: in a case where the UE only establishes the restricted PDU session.

Specifically, in the remote configuration process, if the UE only establishes the restricted PDU session and the UE does not obtain a provisioning server (PVS) address, the UE needs to perform PVS query based on the FQDN to acquire the PVS address. In view that the FQDN needs to carry a host name and a name of a domain name at the same time, the UE needs to first acquire the corresponding DNS information before using the FQDN based on the DNS information and the host name. However, in a process of acquiring the DNS information by the UE, as the UE only establishes the restricted PDU session at this time, the DNS query data issued by the UE will be discarded, resulting in DNS query failure. That is to say, in the above case, because the UE cannot query the DNS information, the PVS query cannot be executed based on the FQDN, ultimately resulting in service failure.

In this embodiment of this application, by sending the first rule for data processing or the rule parameters used for forming the first rule for data processing to the UPF to make the UPF allow the data related to the domain name query and/or the data related to the configuration server query to pass through (i.e. not discarded), and return a query result to the UE, a DNS query function and a PVS query function cannot be individually controlled.

Compared to the related art, in this embodiment of this application, the data related to the domain name query and/or the data related to the configuration server query are/is individually controlled. Therefore, it is possible to allow the data related to the domain name query and/or the data related to the configuration server query to pass through, thereby avoiding service failure caused by discarding the data related to the domain name query and/or the data related to the configuration server query in the related art.

Certainly, the above UPF may further execute the data passing control operation individually on the data related to configuration query (including the PVS query, and for ease of explanation, only the PVS query is used as an example in the following embodiments) based on the above first rule for data processing or the rule parameters used for forming the first rule for data processing, which will not be specifically explained here.

In addition, in order to determine by the UPF whether the received data is the data related to the domain name query, the first rule for data processing may be constructed at least based on address information of the domain name query server.

In specific implementation, the above data related to the domain name server address may include at least one of the following: domain name query data and domain name query response data. The above data related to the configuration server address may include at least one of the following: configuration query data and configuration query response data.

In specific implementation, in order to judge whether the data is the data packet related to the domain name query or the data related to the configuration query, it may be judged based on whether the destination address or source address of the data is a domain name query server or a configuration server.

Specifically, the data related to the domain name query includes: data with a destination address or a source address being an address of the domain name query server; or, data with a destination or a source being the domain name query server; and the data related to the provisioning server query includes data with a destination address or a source address being an address of the provisioning server; or, data with a destination or a source being the provisioning server.

The above data with the destination address being the address of the domain name query server is DNS query request data; and the above data with the source address being the address of the domain name query server is DNS query response data.

Correspondingly, the above data with the destination address being the address of the provisioning server is PVS query request data; and the above data with the source address being the address of the provisioning server is PVS query response data.

Certainly, in addition to a mode of judging whether the data is the data related to the domain name query or the data related to the provisioning server query through an address of a data packet, it may further be determined whether the data is data received or issued by the domain name query server or the provisioning server in a mode of judging a device name and a device identifier of sending or receiving the data, and when it is determined that the data is the data received or issued by the domain name query server or the provisioning server, it is determined that the data is the data related to the domain name query or the data related to the provisioning server query.

In this implementation, passing control on the data related to the PVS query and the data related to the DNS query may be implemented at the same time through one first rule for data processing.

Certainly, the above rule parameters used for forming the first rule for data processing may also include DNS address information, a device identifier of the DNS (i.e. the domain name query server), or identification information of the DNS, etc.

Optionally, the first rule for data processing includes a forwarding action rule (Forwarding Action Rule, FAR) or packet detection rules (PDR).

The PDR includes various pieces of information used for classifying data arriving at the UPF, and each PDR is used for detecting data in a specific transmission direction, such as an uplink direction and a downlink direction.

The FAR is used for defining how to buffer, discard, or forward the data, including data encapsulation/de-encapsulation and destination forwarding.

In specific implementation, the above FAR or PDR may be generated based on the DNS and/or PVS address information configured locally by the SMF, or SMF can receive DNS and/or PVS address information sent by other network devices (such as: PCF, an application function (AF), a local DNS resolver (LDNSR), a default credential server (DCS), and a subscription owner), so that the SMF generates the above FAR or PDR based on the received DNS and/or PVS address information.

For example: the data related to the DNS address and the PVS address in the FAR is set to pass through, and PDR may not be set for the second data. According to the first rule for data processing, the second data will be discarded.

In the above implementation, it is possible to utilize an existing FAR or PDR to save a processing rule for DNS query data, thereby reducing implementation complexity.

In practical application, the above FAR or PDR and a rule used for querying data through the configuration server (for ease of explanation, in the following embodiments, illustration is made only by taking the configuration server being the PVS as an example, which does not constitute specific limitation here) may be the same rule.

The configuration server may be used for configuring a network (such as a stand-alone NPN (SNPN) type network) certificate and/or subscription data to the terminal. The subscription information may be data used for primary authentication, and may further be data used for secondary authentication, network slice-specific authentication and authorization (NSSAA) and other purposes.

It is to be noted that, the above solution may be used not only for the SNPN, but also for a public network integrated NPN (PNI-NPN), which is not specifically limited here.

On the basis of the FAR or the PDR carrying both a passing rule of the data related to DNS query and a passing rule of the data related to configuration server query, the first rule for data processing is further related to address information of the provisioning server, and is used for executing a data passing control operation on data related to provisioning server query.

Same as the address information of the domain name query server above, in specific implementation, the address information of the provisioning server above may be the PVS address information configured locally by the SMF, or the PVS address information sent by other network devices (such as the PCF, the AF, the LDNSR, the DCS, and the subscription owner) or the UE, which is not specifically limited here.

Optionally, the first policy information includes at least one of the following:

relevant policy information requiring to execute an operation of allowing the first data to pass through; and relevant policy information requiring to execute a control operation of not allowing the second data to pass through or discarding the second data.

It is to be noted that, the above relevant policy information requiring to execute the control operation of not allowing the second data to pass through or discarding the second data implies: a meaning of the relevant policy information requiring to execute the operation of allowing the first data to pass through.

Optionally, the first rule for data processing includes at least one of the following:

executing an operation of allowing the first data to pass through; and executing an operation of not allowing the second data to pass through or discarding the second data.

It is to be noted that, the above relevant policy information requiring to execute the control operation of not allowing the second data to pass through or discarding the second data implies: a meaning of the relevant policy information executing the operation of allowing the first data to pass through.

Optionally, the first policy information contains the first information;

and/or the first rule for data processing contains the first information.

Optionally, executing the first operation according to the first information includes:

executing, in a case of confirming that the terminal accesses a first network through a first access mode, the first operation according to the first information, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

In specific implementation, the access mode of accessing the network for acquiring the certificate and/or the subscription may include: an access mode of accessing a network for remotely acquiring the certificate and/or the subscription.

In addition, the restricted data channel may include at least one of the following: a data channel that allows the first data to pass through, and a data channel that does not allow the second data to pass through. Moreover, the data channel may include a PDU session.

Certainly, the above first access mode may further include Onboarding.

In this embodiment of this application, a first communication device acquires the first information, the first information including at least one of the following: domain name server address information and configuration server address information; and executes a first operation according to the first information, the first operation including at least one of the following: determining first policy information; and sending the first information or the first policy information, the first policy information being used for determining a first rule for data processing; the first rule for data processing being used for performing data passing related control on first data and/or second data; the first data including at least one of the following: data related to a domain name server address and data related to a configuration server address; and the second data including at least one of the following: data independent of the domain name server address, data independent of the configuration server address, and/or non-first data. In this way, the data passing related control may be individually performed on the data related to DNS query and/or the data related to configuration server query, for example: allowing the data related to DNS query and/or the data related to configuration server query to pass through, or not allowing the data independent of the DNS query and/or the data independent of the configuration server query to pass through.

Please refer to FIG. 3, which is a flowchart of an information processing method provided in this embodiment of this application. The method is used for a second communication device, the second communication device may be an SMF, and as shown in FIG. 3, the method may include the following steps:

Step 301, second information is acquired, the second information including at least one of the following: first information and first policy information.

Step 302, a second operation is executed according to the second information, the second operation including at least one of the following:

determining a first rule for data processing; and sending the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In specific implementation, above sending the first information or the first rule for data processing may be: sending, by the SMF, the first information or the first rule for data processing to a UPF.

Moreover, the above first information, first policy information, and first rule for data processing have the same meaning and function as the first information, first policy information, and first rule for data processing in the method embodiment shown in FIG. 2, and will not be repeated here.

Optionally, the operation of determining the first rule for data processing includes at least one of the following:

setting a data detection rule for the first data;

setting a data forwarding rule for the first data and allowing the first data to pass through;

setting the data forwarding rule for the second data, and not allowing the second data to pass through or discarding the second data; and not setting the data detection rule and/or the data forwarding rule for the second data.

In specific implementation, the above data detection rule may include a PDR, and the above data forwarding rule may include an FAR. For example: data related to the DNS address and data related to a PVS address in the FAR are set to pass through, and PDR may not be set for the second data. It is not difficult to understand that data without the corresponding PDR will be discarded, which means that the second data will be discarded according to the first rule for data processing, Optionally, the first rule for data processing is at least related to address information of the domain name query server.

In specific implementation, the first rule for data processing above is at least related to the address information of the domain name query server, which may be understood as: in order to determine by the UPF whether the received data is the data related to the domain name query, the first rule for data processing may be constructed at least based on the address information of the domain name query server.

Correspondingly, the first rule for data processing may be further related to address information of a provisioning server, and is used for executing a data passing operation on data related to provisioning server query.

Optionally, acquiring the second information includes:

obtaining the first information from a terminal;

receiving the second information from a first communication device;

obtaining the second information through a local configuration;

receiving address information of a configuration server from a fifth communication device; and receiving data related to domain name query from the domain name query server, and obtaining the address information of the configuration server according to the data related to domain name query, the fifth communication device including confirming the address information of the configuration server according to the data related to a domain name query result.

In one implementation, the above first communication device may be the first communication device applying the method embodiment shown in FIG. 2.

For example: an SMF receives a policy carrying rule parameters from a PCF, and the SMF may parse the policy to obtain the rule parameters used for generating the first rule for data processing.

In addition, the policy carrying the rule parameters issued by the PCF may be a policy for restricting passage of the data, and the policy for restricting the passage of the data may include at least one of the following: a policy used for a data channel of a user plane configuration certificate; a policy used for a data channel of a first access mode (such as Onboarding); and a policy used for determining whether to allow the data to pass through (for example, a policy used for determining whether to allow the data to pass through a gateway (such as: a UPF).

In one implementation, the first access mode contains Onboarding access.

In one implementation, the data detection rule includes the PDR.

In one implementation, a data forwarding rule includes the FAR. For example, two addresses of the FAR are set to pass through and the PDR may not be set for the second data, and the second rule will be discarded according to the rule.

The data processing rule is at least related to the address information of the domain name query server.

The data processing rule is further related to address information of the provisioning server, and is used for executing a data passing operation on data related to provisioning server query.

The second information is received from the second communication device (such as the PCF), or the second information is obtained through local configuration.

Executing an operation of allowing the first data to pass through and/or executing an operation of not allowing the second data to pass through include/includes at least one of the following operations:

only allowing data related to domain name query and data related to provisioning server query to pass through;

not allowing data other than the data related to the domain name query and the data related to the provisioning server query to pass through; and discarding the data other than the data related to the domain name query and the data related to the provisioning server query.

In another implementation, the second communication device may obtain the second information based on a local configuration, such as: a local policy.

Certainly, the above second information may further be acquired from the terminal or received from the fifth communication device. The fifth communication device may be an edge application server detection function (EASDF).

For example: acquiring the configuration server address through a reporting rule may specifically include at least one of the following:

setting the reporting rule according to the DNS address;

sending the reporting rule to a target end (such as the LDNSR);

receiving address information sent by the target end; and using the address information sent by the target end as the address of the configuration server.

In this implementation, the second communication device may acquire the rule parameters through multiple ways to enhance flexibility of the information processing method.

Optionally, the first rule for data processing includes at least one of the following:

executing an operation of allowing the first data to pass through; and executing an operation of not allowing the second data to pass through or discarding the second data.

Optionally, the first rule for data processing contains the first information.

Optionally, executing the second operation according to the second information includes:

executing, in a case of confirming that a terminal accesses a first network through a first access mode, the second operation according to the second information, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

In this implementation, the above first access mode and the like have the same meaning and function as the first access mode and the like in the method embodiment shown in FIG. 2, and will not be repeated here.

In this embodiment of this application, the information processing method applied to the second communication device corresponds to the method embodiment applied to the first communication device as shown in FIG. 2, can achieve the same beneficial effect as the method embodiment shown in FIG. 2, and will not be repeated here.

Please refer to FIG. 4, which is a flowchart of an information processing method provided in this embodiment of this application. The method is used for a third communication device, the third communication device may be a UPF, and as shown in FIG. 4, the method may include the following steps:

Step 401, third information is acquired, the third information including at least one of the following: first information and a first rule for data processing.

Step 402, a third operation is executed according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

In specific implementation, above performing the data passing related control on the first data and/or the second data may include: in a remote configuration process, allowing data related to domain name query carried by a restricted PDU session to pass through, so that when DNS request data sent by UE is acquired, the DNS query request data is not discarded, and corresponding DNS query response data is further returned to the UE at the same time to achieve a DNS query function on the restricted PDU session.

Certainly, above performing the data passing related control on the first data and/or the second data may further include: in a configuration query process, allowing data related to configuration query carried by the restricted PDU session to pass through, so that when PVS request data sent by the UE is acquired, the PVS query request data is not discarded, and corresponding PVS query response data is further returned to the UE at the same time to achieve a PVS query function on the restricted PDU session.

Compared to the related art, in this embodiment of this application, the data related to the domain name server address and/or the data related to the configuration server address are individually controlled. Therefore, it is possible to allow the data related to the domain name server address and/or the data related to the configuration server address to pass through, thereby avoiding service failure caused by discarding the data related to the domain name server address and/or the data related to the configuration server address in the related art.

In specific implementation, the above first rule for data processing may be a first rule for data processing received from an SMF, or the first rule for data processing may be generated based on rule parameters received from the SMF, and the first rule for data processing has the same meaning and function as the first rule for data processing in the method embodiment shown in FIG. 2 or FIG. 3, and will not be repeated here.

Optionally, acquiring the third information includes:

receiving the third information from a first communication device;

obtaining the first information through a local configuration;

receiving address information of a configuration server from a fifth communication device; and receiving data related to domain name query, and obtaining the address information of the configuration server according to the data related to domain name query, the fifth communication device including confirming the address information of the configuration server according to the data related to a domain name query result.

The above first communication device is the first communication device applying the method embodiment shown in FIG. 2. The above fifth communication device has the same meaning as the fifth communication device in the method embodiment shown in FIG. 2 or FIG. 3, and will not be repeated here.

Optionally, the first rule for data processing includes at least one of the following:

executing an operation of allowing the first data to pass through; and executing an operation of not allowing the second data to pass through or discarding the second data.

Optionally, acquiring the third information includes: acquiring the third information in a case of confirming that a terminal accesses a first network through a first access mode, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

In one implementation, the first access mode contains Onboarding access.

In one implementation, the data detection rule includes a PDR.

In one implementation, a data forwarding rule includes an FAR. For example, two addresses of the FAR are set to pass through and the PDR may not be set for the second data, and the second rule will be discarded according to the rule.

The data processing rule is at least related to the address information of the domain name query server.

The data processing rule is further related to address information of the provisioning server, and is used for executing a data passing operation on data related to provisioning server query.

Second information is received from a second communication device (such as a PCF), or the second information is obtained through local configuration.

Executing an operation of allowing the first data to pass through and/or executing an operation of not allowing the second data to pass through include/includes at least one of the following operations:

only allowing data related to domain name query and data related to provisioning server query to pass through;

not allowing data other than the data related to the domain name query and the data related to the provisioning server query to pass through; and discarding the data other than the data related to the domain name query and the data related to the provisioning server query.

The above first data, second data, and first access mode have the same meaning as the first data, second data, and first access mode in the method embodiment shown in FIG. 2 or FIG. 3 respectively and will not be repeated here, and the information processing method provided in this embodiment of this application corresponds to the method embodiment shown in FIG. 2 or FIG. 3, can achieve the same beneficial effects as the method embodiments shown in FIG. 2 or FIG. 3, and will not be repeated here.

Please refer to FIG. 5, which is a flowchart of another information processing method provided in this embodiment of this application. The method is used for a fourth communication device, the fourth communication device may be UE, and as shown in FIG. 5, the method may include the following steps:

Step 501, first information is sent, the first information including at least one of the following: domain name server address information, and configuration server address information.

In specific implementation, the UE (i.e. a terminal) may send the first information to the first communication device applying the method embodiment shown in FIG. 2, and/or send the first information to the second communication device applying the method embodiment shown in FIG. 3.

Optionally, sending the first information includes: sending the first information in a case of confirming that the terminal accesses a first network through a first access mode, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

In one implementation, the first access mode contains Onboarding access.

In specific implementation, the above first access mode has the same meaning as the first access mode in the method embodiment shown in FIG. 2 or FIG. 3, and will not be repeated here.

In this embodiment of this application, the information processing method used for the fourth communication device corresponds to the method embodiment as shown in FIG. 2 and/or FIG. 3, has the same beneficial effect, and will not be repeated here.

This embodiment of this application further provides a flowchart of a configuration method, and the configuration method may include the following step:

an SMF sends a data processing rule or rule parameters used for forming the data processing rule, the data processing rule being at least used for executing a data passing control operation on data related to domain name query and/or data related to provisioning server query in a remote configuration process.

In specific implementation, the above data processing rule may be equivalent to the first rule for data processing in any method embodiment as shown in FIG. 2 to FIG. 5, the above rule parameters may be equivalent to the first information in any method embodiment as shown in FIG. 2 to FIG. 5, and the above SMF is used for sending the data processing rule or the first information (i.e. rule parameters) used for forming the data processing rule to a UPF, so that the UPF executes the data passing control operation on the data related to the domain name query and/or the data related to the provisioning server query in the remote configuration process, thus UE can obtain correct DNS information and/or a PVS address from the domain name query server, and utilize the DNS information to achieve PVS discovery based on a fully qualified domain name (FQDN) in a case that only a restricted PDU session is established.

It is to be understood that this application may be specifically applied to any scenario where DNS query data and/or the data related to the provisioning server query are/is discarded in the UPF to achieve correct processing of a service, for example: in a case where the UE only establishes the restricted PDU session.

Specifically, taking DNS query as an example, in the remote configuration process, if the UE only establishes the restricted PDU session and the UE does not obtain a provisioning server (PVS) address, the UE needs to perform PVS query based on the FQDN to acquire the PVS address. In view that the FQDN needs to carry a host name and a name of a domain name at the same time, the UE needs to first acquire the corresponding DNS information before using the FQDN based on the DNS information and the host name. However, in a process of acquiring the DNS information by the UE, as the UE only establishes the restricted PDU session at this time, a DNS query data packet issued by the UE will be discarded, resulting in DNS query failure. That is to say, in the above case, because the UE cannot query the DNS information, the PVS query cannot be executed based on the FQDN, ultimately resulting in service failure.

In this embodiment of this application, by sending the data processing rule or the rule parameters used for forming the data processing rule to the UPF to make the UPF allow the data related to the domain name query and/or the data related to the provisioning server query to pass through (i.e. not discarded), and return a query result to the UE, a DNS query function and remote configuration can be achieved.

Compared to the related art, in this embodiment of this application, the data related to the domain name query and/or the data related to the provisioning server query are/is individually controlled. Therefore, it is possible to allow the data related to the domain name query and/or the data related to the provisioning server query to pass through, thereby avoiding service failure caused by discarding the data related to the domain name query and/or the data related to the provisioning server query in the related art.

In specific implementation, the above data related to the domain name query may include at least one of the following: domain name query data and domain name query response data.

in order to determine by the UPF whether the received data packet is a data packet related to the domain name query, the data processing rule may be constructed at least based on address information of the domain name query server.

In specific implementation, the address information of the domain name query server above may be address information configured locally by the SMF, or address information sent by other network devices (such as a PCF, an AF, an LDNSR, a DCS, and a subscription owner), or address information sent by the UE, which is not specifically limited here.

In practical application, it is possible to determine whether the data is the data packet related to the domain name query based on a correlation relationship between the data processing rule and the DNS address information. For example: the UPF may be made to judge whether the data is the data related to the domain name query according to whether a destination address or source address of the received data is DNS.

Certainly, in addition to the above mode of relating the data processing rule to the DNS address information, whether the data is the data related to the domain name query may also be determined according to a correlation between the data processing rule and a type or name of the data, for example: the data processing rule may be established according to data type information carried in the data, thus the UPF may determine whether the data is the data related to the domain name query based on the type of the data received, thereby determining whether to allow the data to pass through. For another example, the data processing rule may be established according to a device identifier of a receiving device or a sending device carried in the data, thus the UPF may determine whether the data is the data related to the domain name query based on the device identifier of the receiving device or the sending device in the data received, thereby determining whether to allow the data to pass through.

Correspondingly, the above rule parameters used for forming the data processing rule may also include DNS address information, a device identifier of the DNS (i.e. the domain name query server), or identification information of the DNS, etc.

Optionally, the data processing rule sent by the SMF is a forwarding action rule (FAR) or packet detection rules (PDR).

The PDR includes various pieces of information used for classifying data arriving at the UPF, and each PDR is used for detecting data in a specific transmission direction, such as an uplink direction and a downlink direction.

The FAR is used for defining how to buffer, discard, or forward the data, including data encapsulation/de-encapsulation and destination forwarding.

In specific implementation, the above FAR or PDR may be generated based on the DNS and/or PVS address information configured locally by the SMF, or SMF can receive DNS and/or PVS address information sent by other network devices (such as: the PCF, the AF, the LDNSR, the DCS, and the Subscription Owner), so that the SMF generates the above FAR or PDR based on the received DNS and/or PVS address.

In the above implementation, it is possible to utilize an existing FAR or PDR to save a processing rule for DNS query data, thereby reducing implementation complexity.

In practical application, the above FAR or PDR and a rule used for querying data through the configuration server (for ease of explanation, in the following embodiments, illustration is made only by taking the configuration server being the PVS as an example, which does not constitute specific limitation here) may be the same rule.

The configuration server may be used for configuring a network (such as a standalone NPN (SNPN) type network) certificate and/or subscription data to the terminal. The subscription information may be data used for primary authentication, and may further be data used for secondary authentication, NSSAA, and other purposes.

It is to be noted that, the above solution may be used not only for the SNPN, but also for a public network integrated NPN (PNI-NPN), which is not specifically limited here.

On the basis of the FAR or the PDR carrying both a passing rule of the data related to DNS query and a passing rule of the data related to configuring server query, the data processing rule is further related to address information of the provisioning server, and is used for executing a data passing control operation on data related to provisioning server query.

Same as the address information of the domain name query server above, in specific implementation, the address information of the provisioning server above may be the PVS address information configured locally by the SMF, or the PVS address information sent by other network devices (such as the PCF, the AF, the LDNSR, the DCS, and the subscription owner) or the UE, which is not specifically limited here.

In practical application, it is possible to determine whether the data is the data packet related to the provisioning server query based on a correlation relationship between the data processing rule and the PVS address information. For example: the UPF may be made to judge whether the data is the data related to the provisioning server query according to whether a destination address or source address of the received data packet is PVS.

Certainly, in addition to the above mode of relating the data processing rule to the PVS address information, whether the data is the data related to the provisioning server query may also be determined according to a correlation between the data processing rule and a type or name of the data, for example: the data processing rule may be established according to data type information carried in the data type, thus the UPF may determine whether the data is the data related to the provisioning server query based on the type of the data received, thereby determining whether to allow the data to pass through. For another example, the data processing rule may be established according to a device identifier of a receiving device or a sending device carried in the data, thus the UPF may determine whether the data is the data related to the provisioning server query based on the device identifier of the receiving device or the sending device in the data received, thereby determining whether to allow the data to pass through.

In this implementation, passing control on the data related to the PVS query and the data related to the DNS query may be implemented at the same time through one data processing rule.

Optionally, in order to acquire the above PVS address information, after the above step that the SMF sends the data processing rule or the rule parameters used for forming the data processing rule, the configuration method provided by this application further includes:

the SMF receives the data related to the domain name query sent by the domain name query server and carrying the address information of the provisioning server.

In specific implementation, after configuring a passing rule for a data packet related to DNS query, the SMF can receive DNS response data returned by the DNS after sending DNS query data packet. In this way, the process of acquiring the address information of the provisioning server can be simplified by carrying the address information of the provisioning server in the DNS response data. That is to say, when there is no address for the configuration server, the configuration server address can be acquired according to a DNS query result of the terminal.

Certainly, in specific implementation, the configured server address may also be received from network side devices such as the terminals or the AF.

Optionally, the data passing control operation includes at least one of the following operations:

only allowing data related to domain name query and data related to provisioning server query to pass through;

not allowing data other than the data related to the domain name query and the data related to the provisioning server query to pass through; and discarding the data other than the data related to the domain name query and the data related to the provisioning server query.

It is to be noted that, above not allowing the data other than the data related to the domain name query and the data related to the provisioning server query to pass through implies: a meaning of allowing the data related to the domain name query and the data related to the provisioning server query to pass through. Above discarding the data other than the data related to the domain name query and the data related to the provisioning server query implies: a meaning of not discarding the data related to the domain name query and the data related to the provisioning server query.

In specific implementation, in order to judge whether the data is the data packet related to the domain name query or the data related to the provisioning server query, it may be judged based on whether a destination address or source address of the data packet is a domain name query server or a provisioning server.

Specifically, the data related to the domain name query includes: data with a destination address or a source address being an address of the domain name query server; or, data with a destination or a source being the domain name query server; and the data related to the provisioning server query includes data with a destination address or a source address being an address of the provisioning server; or, data with a destination or a source being the provisioning server.

The above data with the destination address being the address of the domain name query server is DNS query request data; and the above data with the source address being the address of the domain name query server is DNS query response data.

Correspondingly, the above data with the destination address being the address of the provisioning server is PVS query request data; and the above data with the source address being the address of the provisioning server is PVS query response data.

Certainly, in addition to a mode of judging whether the data packet is the data related to the domain name query or the data related to the provisioning server query through the address of the data, it may further be determined whether the data is data received or issued by the domain name query server or the provisioning server in a mode of judging a device name and a device identifier of sending or receiving the data, and when it is determined that the data is the data received or issued by the domain name query server or the provisioning server, it is determined that the data is the data related to the domain name query or the data related to the provisioning server query.

In practical application, the above data processing rule may be generated by the SMF based on a locally configured the rule parameters such as DNS and/or PVS addresses. Certainly, in a case that the SMF does not locally configure the rule parameters such as the DNS and/or PVS addresses, the SMF needs to receive the rule parameters such as the DNS and/or PVS address information sent by other devices, so that the SMF generates the above data processing rules based on the received rule parameters.

That is to say, before the above step that the SMF sends the data processing rule or the rule parameters used for forming the data processing rule, the configuration method provided by this application may further include the following steps:

the SMF receives the rule parameters from a terminal or a network device;

or, the SMF uses the rule parameters saved locally in the SMF;

or, the SMF receives a policy carrying the rule parameters from the PCF.

In specific implementation, the above network side device may include the PCF, the AF, the LDNSR, the DCS, the subscription owner, etc.

For example: acquiring the configuration server address through a reporting rule may specifically include at least one of the following:

setting the reporting rule according to the DNS address;

sending the reporting rule to a target end (such as the LDNSR);

receiving address information sent by the target end; and using the address information sent by the target end as the address of the configuration server.

In addition, in a case that the SMF receives the policy carrying the rule parameters from the PCF, the SMF may parse the policy to obtain the rule parameters. In addition, the policy carrying the rule parameters issued by the PCF may be a policy for restricting passage of the data, and the policy for restricting the passage of the data may include at least one of the following: a policy used for a data channel of a user plane configuration certificate; a policy used for a data channel of a first access mode (Onboarding); and a policy used for determining whether to allow the data to pass through (for example, a policy used for determining whether to allow the data to pass through a gateway (such as: a UPF).

In this implementation, the SMF may acquire the rule parameters through multiple ways to enhance flexibility of the configuration method.

In this embodiment of this application, the SMF sends the data processing rule or the rule parameters used for forming the data processing rule, and the data processing rule is at least used for executing a data passing control operation on the data related to the domain name query and/or the data related to the provisioning server query in a remote configuration process, so that the UPF at least performs the data control operation on the data related to the domain name query and/or the data related to the provisioning server query in the remote configuration process according to the data processing rule, and thus the DNS query data and/or the data related to the provisioning server query are/is not discarded.

This embodiment of this application further provides a flowchart of another configuration method, and the configuration method may include the following steps:

a PCF sends rule parameters used for forming a data processing rule or a policy carrying the rule parameters, the data processing rule being at least used for executing a data passing control operation on data related to domain name query and/or data related to provisioning server query in a remote configuration process.

The above policy carrying the rule parameters may be any policy that may be transmitted to an SMF, as long as it has sufficient fields to save the above rule parameters.

In specific implementation, the PCF may send the above rule parameters used for forming the data processing rule or the policy carrying the rule parameters to the SMF.

In addition, the above data processing rules have the same meaning and function as the data processing rule applied in the configuration method embodiment of the SMF, and will not be repeated here.

Optionally, the data processing rule is at least related to address information of a domain name query server.

Optionally, the data processing rule is further related to address information of a provisioning server, and is used for executing a data passing control operation on data related to provisioning server query.

In this embodiment of this application, implementations that the SMF receives the rule parameters used for forming the data processing rule or the policy carrying the rule parameters from the PCF in the embodiments of the configuration method applied to the PCF and the configuration method applied to the SMF have the same meaning, can achieve the same beneficial effect, and will not be repeated here.

This embodiment of this application further provides a flowchart of a data control method, and the data control method may include the following step:

a UPF at least executes a data passing control operation on data related to domain name query and/or data related to provisioning server query according to a data processing rule in a remote configuration process.

Above at least executing the data passing control operation on the data related to the domain name query and/or the data related to the provisioning server query in the remote configuration process may be understood as: in the remote configuration process, allowing the data related to the domain name query and/or the data related to the provisioning server query carried by a restricted PDU session to pass through, so that when DNS request data and/or PVS request data sent by UE are/is acquired, the DNS query request data and/or PVS request data are/is not discarded, and corresponding DNS query response data and/or PVS query response data are/is further returned to the UE at the same time to achieve a DNS query function and PVS query function on the restricted PDU session.

Compared to the related art, in this embodiment of this application, the data related to the domain name query and/or the data related to the provisioning server query are/is individually controlled. Therefore, it is possible to allow the data related to the domain name query and/or the data related to the provisioning server query to pass through, thereby avoiding service failure caused by discarding the data related to the domain name query and/or the data related to the provisioning server query in the related art.

In specific implementation, the above data processing rule may be a data processing rule received from an SMF, or a data processing rule generated based on rule parameters received from the SMF, and the data processing rule has the same meaning and function as the data processing rule in the configuration method embodiment applied to the SMF, and will not be repeated here.

Optionally, the data processing rule is at least related to address information of a domain name query server.

Optionally, the data processing rule is further related to address information of a provisioning server, and is used for executing a data passing control operation on data related to provisioning server query.

Optionally, the data passing control operation includes at least one of the following operations:

only allowing the data related to the domain name query and the data related to the provisioning server query to pass through;

not allowing data other than the data related to the domain name query and the data related to the provisioning server query to pass through; and discarding the data other than the data related to the domain name query and the data related to the provisioning server query.

Optionally, the data related to the domain name query includes: data with a destination address or a source address being an address of the domain name query server; or, data with a destination or a source being the domain name query server; and the data related to the provisioning server query includes data with a destination address or a source address being an address of the provisioning server; or, data with a destination or a source being the provisioning server.

Optionally, before at least executing the data passing control operation on the data related to the domain name query and/or the data related to the provisioning server query according to the data processing rule in a remote configuration process, the method further includes:

a UPF receives the data processing rule from the SMF; or, the UPF receives the rule parameters used for forming the data processing rule from the SMF;

or, the UPF receives a policy carrying the rule parameters sent by the PCF from the SMF.

Optionally, the data processing rule received from the SMF is an FAR or a PDR.

In this embodiment of this application, the data control method applied to the UPF is to execute the specific data control process based on the data processing rule acquired in the configuration method applied to the SMF or the rule parameters used for forming the data processing rule, and has the same beneficial effect as the configuration method embodiment applied to the SMF, which will not be repeated here to avoid repetition.

For ease of understanding, the configuration method and the data control method provided in the embodiments of this application are illustrated with embodiments as shown in FIG. 6a and FIG. 6b.

In an application scenario where a PCC is not deployed on a network side, the data processing rule may be generated through rule parameters locally configured in the SMF.

FIG. 6a is a schematic flowchart of an information processing method provided in another embodiment of this application, and the information processing method includes the following steps:

step 601a, an SMF acquires rule parameters.

In implementation, the SMF may acquire first information through any of the following modes:

a terminal sends the first information to the SMF, and the first information may contain address information of a DNS and/or a PVS;

the SMF locally configures the first information; and the SMF receives a first policy from a PCF, and the SMF can parse from the first policy to obtain the first information.

Step 602a, the SMF generates an FAR based on the first information.

In this step, the SMF may generate a first rule for data processing based on the first information, and the first rule for data processing may be either the FAR or a PDR.

Step 603a, the SMF sends the first rule for data processing to a UPF.

The UPF executes a data passing control operation on data related to domain name query and/or data related to provisioning server query according to a data processing rule in a remote configuration process.

Step 604a: the SMF indirectly acquires PVS information in a process that UE initiates DNS query.

In this step, in the process that the UE initiates DNS query, the SMF can acquire DNS domain name information returned by a DNS, then uses the DNS domain name information and a host name to form an FQDN, and performs the PVS query based on the FQDN to acquire a PVS address.

Certainly, in a process that the UE initiates PVS query, the data related to the PVS query will not be discarded by a gateway, so that the SMF can acquire the PVS address information returned by the PVS.

In addition, in an application scenario where a PCC is deployed on the network side, second policy information may be generated by receiving rule parameters sent by the terminal or the network side device based on the rule parameters.

FIG. 6b is a schematic flowchart of an information processing method provided in another embodiment of this application, and the information processing method includes the following steps:

Step 601b, an SMF acquires first information.

In implementation, the SMF may acquire the first information through any of the following modes:

a terminal sends the first information to the SMF, and the first information may contain address information of a DNS and/or a PVS; and the SMF locally configures the first information.

Step 602b, the SMF sends the first information to a UPF.

After receiving the first information, the UPF can generate a first rule for data processing based on the first information, and executes a data passing control operation on data related to domain name query and/or data related to provisioning server query according to the first rule for data processing in a remote configuration process. Similarly, in a process that UE initiates DNS query, the SMF can acquire DNS domain name information returned by the DNS, then uses the DNS domain name information and a host name to form an FQDN, and performs the PVS query based on the FQDN to acquire a PVS address. Moreover, in a process that the UE initiates PVS query, the data related to the PVS query will not be discarded by a gateway, so that the SMF can acquire the PVS address information returned by the PVS.

It is to be noted that, executing subjects of the configuration method and the data control method provided in this embodiment of this application may be a configuration apparatus and a data control apparatus respectively, or control modules respectively used for executing the configuration method and the data control method in the configuration apparatus and the data control apparatus. In this embodiment of this application, the configuration apparatus and the data control apparatus provided in this embodiment of this application are illustrated by taking an example that the configuration apparatus and the data control apparatus respectively execute the configuration method and the data control method.

Figure 7:
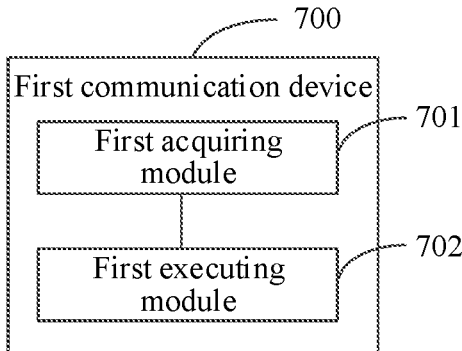
FIG. 7 is a structural diagram of a first communication device provided in an embodiment of this application.

Please refer to FIG. 7, FIG. 7 is a structural diagram of a first communication device provided in an embodiment of this application, and as shown in FIG. 7, the first communication device 700 includes:

a first acquiring module 701, configured to acquire first information, the first information including at least one of the following: domain name server address information and configuration server address information; and a first executing module 702, configured to execute a first operation according to the first information, the first operation including at least one of the following:

determining first policy information; and sending the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

Optionally, the first policy information includes at least one of the following:

relevant policy information requiring to execute an operation of allowing the first data to pass through; and relevant policy information requiring to execute a control operation of not allowing the second data to pass through or discarding the second data.

Optionally, the first rule for data processing includes at least one of the following:

executing an operation of allowing the first data to pass through; and executing an operation of not allowing the second data to pass through or discarding the second data.

Optionally, the first policy information contains the first information;

and/or the first rule for data processing contains the first information.

Optionally, the first executing module 702 is specifically configured to:

execute, in a case of confirming that a terminal accesses a first network through a first access mode, the first operation according to the first information, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

The first communication device 700 provided in this embodiment of this application can execute various processes executed by the first communication device in the information processing method embodiment shown in FIG. 2, and can achieve the same beneficial effect, which will not be repeated here to avoid repetition.

Figure 8:
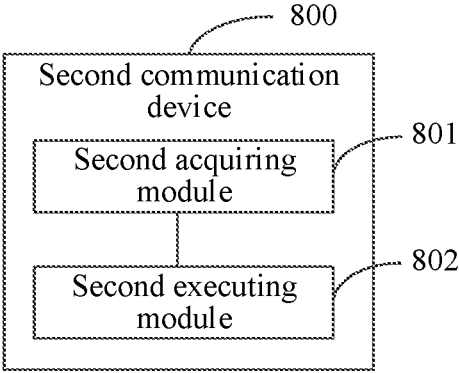
FIG. 8 is a structural diagram of a second communication device provided in an embodiment of this application.

Please refer to FIG. 8, FIG. 8 is a structural diagram of a second communication device provided in an embodiment of this application, and as shown in FIG. 8, the second communication device 800 includes:

a second acquiring module 801, configured to acquire second information, the second information including at least one of the following: first information and first policy information; and a second executing module 802, configured to execute a second operation according to the second information, the second operation including at least one of the following:

determining a first rule for data processing; and sending the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

Optionally, the operation of determining the first rule for data processing executed by the second executing module 802 includes at least one of the following:

setting a data detection rule for the first data;

setting a data forwarding rule for the first data and allowing the first data to pass through;

setting the data forwarding rule for the second data, and not allowing the second data to pass through or discarding the second data; and not setting the data detection rule and/or the data forwarding rule for the second data.

Optionally, the first rule for data processing is at least related to address information of the domain name query server.

Optionally, the first rule for data processing is further related to address information of a provisioning server, and is used for executing a data passing operation on data related to provisioning server query.

Optionally, the second acquiring module 801 is specifically configured to execute at least one of the following:

obtaining the first information from a terminal;

receiving the second information from a first communication device;

obtaining the second information through a local configuration;

receiving address information of a configuration server from a fifth communication device; and receiving data related to domain name query from the domain name query server, and obtaining the address information of the configuration server according to the data related to domain name query, the fifth communication device including confirming the address information of the configuration server according to the data related to a domain name query result.

Optionally, the first rule for data processing includes at least one of the following:

executing an operation of allowing the first data to pass through; and executing an operation of not allowing the second data to pass through or discarding the second data.

Optionally, the first rule for data processing contains the first information.

Optionally, the second executing module 802 is specifically configured to:

execute, in a case of confirming that the terminal accesses a first network through a first access mode, the second operation according to the second information, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

The second communication device 800 provided in this embodiment of this application can execute various processes executed by the second communication device in the information processing method embodiment shown in FIG. 3, and can achieve the same beneficial effect, which will not be repeated here to avoid repetition.

Figure 9:
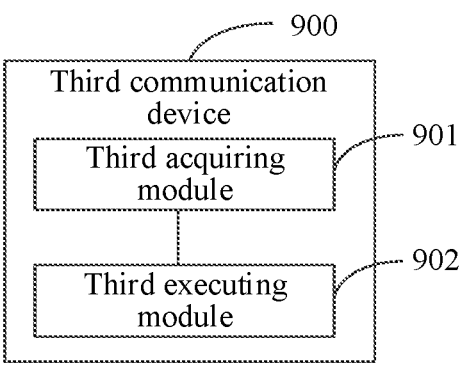
FIG. 9 is a structural diagram of a third communication device provided in an embodiment of this application.

Please refer to FIG. 9, FIG. 9 is a structural diagram of a third communication device provided in an embodiment of this application, and as shown in FIG. 9, the third communication device 900 includes:

a third acquiring module 901, configured to acquire third information, the third information including at least one of the following: first information and a first rule for data processing; and a third executing module 902, configured to execute a third operation according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data.

the first information including at least one of the following: domain name server address information and configuration server address information.

Optionally, the third acquiring module 901 is specifically configured to execute at least one of the following:

receiving the third information from a first communication device;

obtaining the first information through a local configuration;

receiving address information of a configuration server from a fifth communication device; and receiving data related to domain name query, and obtaining the address information of the configuration server according to the data related to domain name query, the fifth communication device including confirming the address information of the configuration server according to the data related to a domain name query result.

Optionally, the first rule for data processing includes at least one of the following:

executing an operation of allowing the first data to pass through; and executing an operation of not allowing the second data to pass through or discarding the second data.

Optionally, the third acquiring module 901 is specifically configured to:

acquire the third information in a case of confirming that a terminal accesses a first network through a first access mode, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

The third communication device 900 provided in this embodiment of this application can execute various processes executed by the third communication device in the information processing method embodiment shown in FIG. 4, and can achieve the same beneficial effect, which will not be repeated here avoid repetition.

Figure 10:
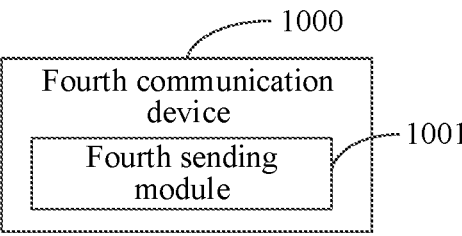
FIG. 10 is a structural diagram of a fourth communication device provided in an embodiment of this application.

Please refer to FIG. 10, FIG. 10 is a structural diagram of a fourth communication device provided in an embodiment of this application, and as shown in FIG. 10, the fourth communication device 1000 includes:

a fourth sending module 1001, configured to send first information, the first information including at least one of the following: domain name server address information, and configuration server address information.

Optionally, the fourth sending module 1001 is specifically configured to:

send the first information in a case of confirming that a terminal accesses a first network through a first access mode, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

The fourth communication device 1000 provided in this embodiment of this application can execute various processes executed by the fourth communication device in the information processing method embodiment shown in FIG. 5, and can achieve the same beneficial effect, which will not be repeated here to avoid repetition.

The configuration apparatus and the data control apparatus in this embodiment of this application may be an apparatus, an apparatus with an operating system or an electronic device, and may further be a component, an integrated circuit, or a chip in the terminal. The apparatus or the electronic device may be a mobile terminal or may be a non-mobile terminal. Exemplarily, the mobile terminal may include, but is not limited to, types of the terminal 11 listed above. The non-mobile terminal may be a server, a network attached storage (NAS), a personal computer (PC), a television (TV), a teller machine, or a self-service machine, which is not specifically limited in this embodiment of this application.

Figure 11:
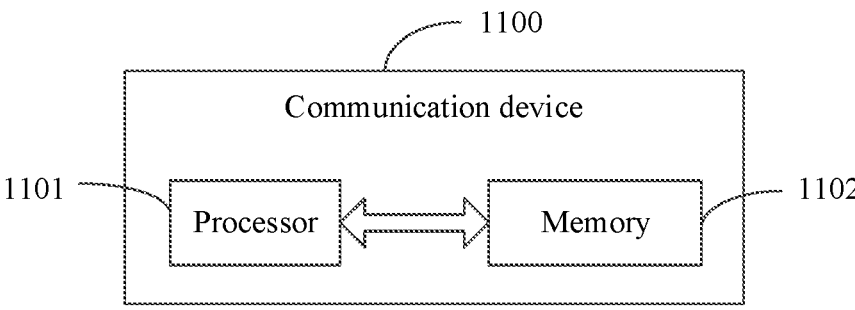
FIG. 11 is a structural diagram of a communication device provided in an embodiment of this application.

Optionally, as shown in FIG. 11, an embodiment of this application further provide a communication device 1100, including a processor 1101, a memory 1102 and a program or instruction stored in the memory 1102 and capable of being run on the processor 1101. For example, when the communication device 1100 is a terminal, the program or instruction, when executed by the processor 1101, implements various processes of the information processing method embodiment shown in FIG. 5, and can achieve the same technical effects. When the communication device 1100 is a network side device, the program or instruction, when executed by the processor 1101, implements various processes of the information processing method embodiment shown in FIG. 2, FIG. 3 or FIG. 4, and can achieve the same technical effects, which will not be repeated here to avoid repetition.

An embodiment of this application further provides a terminal, including a processor and a communication interface, the communication interface being used for sending first information; the first information including at least one of the following: domain name server address information, and configuration server address information.

Figure 12:
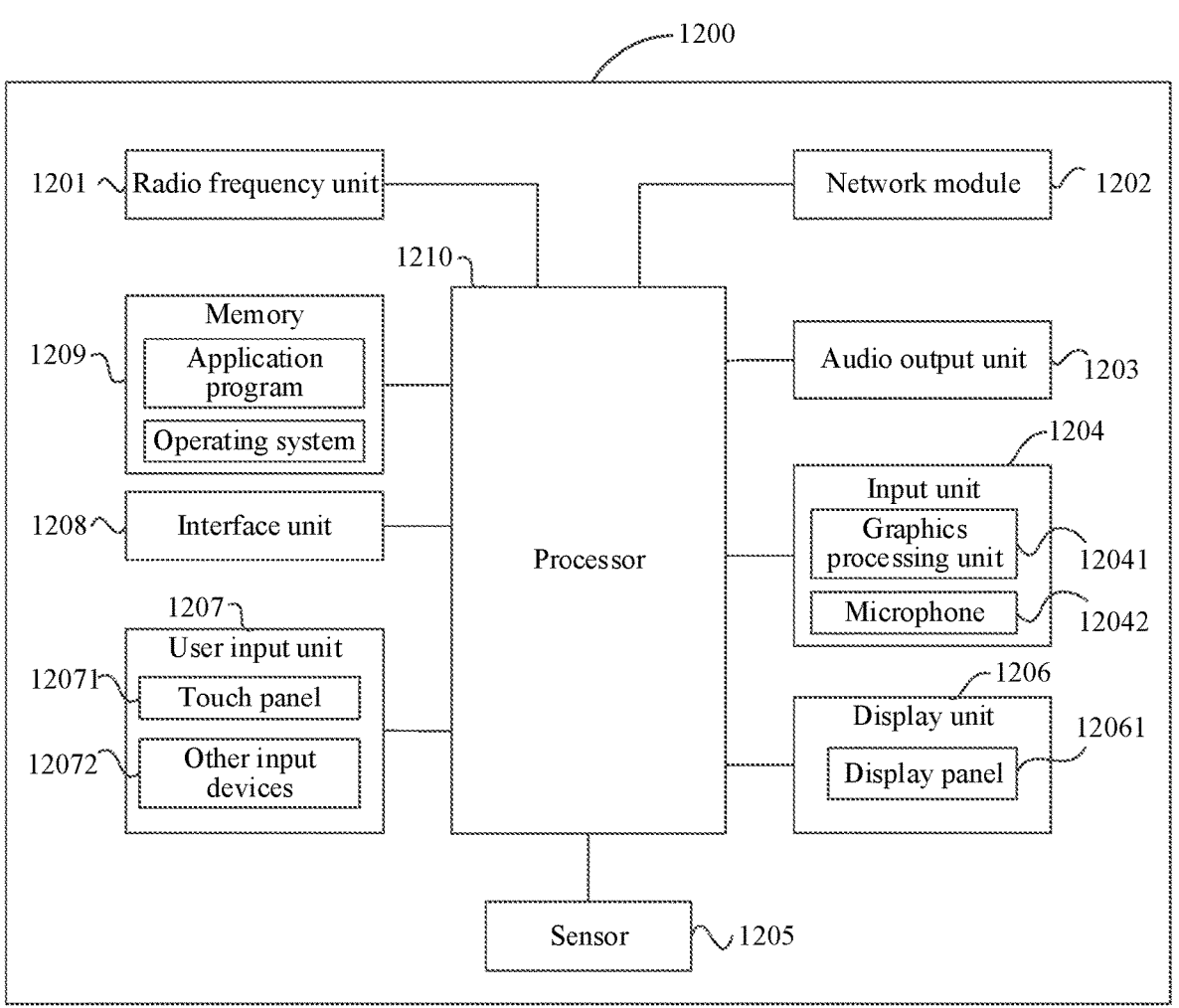
FIG. 12 is a structural diagram of a terminal provided in an embodiment of this application.

The terminal embodiment corresponds to the above method embodiment on a fourth communication device side. The various implementation processes and implementations of the above method embodiments may be applied to the terminal embodiment and can achieve the same technical effects. Specifically, FIG. 12 is a schematic diagram of a hardware structure of a terminal implementing an embodiment of this application.

The terminal 1200 includes, but is not limited to: at least part of components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

Those skilled in the art may understand that the terminal 1200 may further include a power supply (such as a battery) for supplying power to the components. The power supply may be logically connected with the processor 1210 through a power supply management system, thereby implementing functions such as charging, discharging, and power consumption management through the power supply management system. The terminal structure shown in FIG. 12 does not constitute a limitation on the terminal, and the terminal may include more or fewer components than those shown in the figure, or combine some components, or have different component arrangements, which will not be repeated here.

It is to be understood that in this embodiment of this application, the input unit 1204 may include a graphics processing unit (GPU) 12041 and a microphone 12042. The graphics processing unit 12041 performs processing on image data of a static picture or a video that is obtained by an image acquisition device (such as a camera) in a video acquisition mode or an image acquisition mode. The display unit 1206 may include a display panel 12061, and the display panel 12061 may be configured by using a liquid crystal display, an organic light-emitting diode, and other forms. The user input unit 1207 includes a touch panel 12071 and other input devices 12072. The touch panel 12071 is also known as a touch screen. The touch panel 12071 may include two parts: a touch detection apparatus and a touch controller.

Specifically, other input devices 12072 may include, but are not limited to, a physical keyboard, a functional key (such as a volume control key or a switch key), a track ball, a mouse, and a joystick, which are not repeated here.

In this embodiment of this application, the radio frequency unit 1201 receives downlink data from the network side device and sends it to the processor 1210 for processing; in addition, uplink data is sent to the network side device. Generally, the radio frequency unit 1201 includes, but is not limited to, an antenna, at least one amplifier, a transceiver, a coupler, a low noise amplifier, a duplexer, and the like.

The memory 1209 may be configured to store a software program and various pieces of data. The memory 1209 may mainly include a storage program or an instruction area and a storage data area. The storage program or the instruction area may store an operating system, an application program or instruction required by at least one function (for example, a sound playback function and an image display function), and the like. In addition, the memory 1209 may include a high-speed random-access memory, and may further include a non-volatile memory. The non-volatile memory may be a read-only memory (ROM), a programmable ROM (PROM), an erasable PROM (EPROM), an electrically EPROM (EE-PROM) or a flash memory, for example, at least one magnetic disk storage device, a flash memory or other non-volatile solid-state storage devices.

The processor 1210 may include one or more processing units. Optionally, the processor 1210 may integrate an application processor and a modem processor, where the application processor mainly processes an operating system, a user interface, an application program or an instruction, and the like, and the modem processor mainly processes wireless communication, such as a baseband processor. It may be understood that the above modem processor may also not be integrated into the processor 1210.

The radio frequency unit 1201 is configured to send first information, the first information including at least one of the following: domain name server address information, and configuration server address information.

Optionally, sending the first information executed by the radio frequency unit 1201 includes: sending the first information in a case of confirming that a terminal accesses a first network through a first access mode, the first access mode including at least one of the following: an access mode of accessing a network for acquiring a certificate and/or subscription, an access mode using a restricted access network, an access mode of accessing the network by using a default certificate, an access mode capable of only establishing a restricted data channel, and an access mode incapable of establishing a non-restricted data channel.

The terminal 1200 provided in this embodiment of this application can execute various processes in the method embodiment shown in FIG. 5, and can achieve the same beneficial effect, which will not be repeated here to avoid repetition.

An embodiment of this application further provides a network side device, including a processor and a communication interface.

In an implementation where the network side device is a first communication device, the communication interface is configured to acquire first information, and the first information includes at least one of the following: domain name server address information and configuration server address information; and the processor is configured to execute a first operation according to the first information, the first operation including at least one of the following:

determining first policy information; and controlling the communication interface to send the first information or the first policy information, the first policy information being used for determining a first rule for data processing; the first rule for data processing being used for performing data passing related control on first data and/or second data;

the first data including at least one of the following: data related to a domain name server address and data related to a configuration server address; and the second data including at least one of the following: data independent of the domain name server address, data independent of the configuration server address, and/or non-first data.

The first communication device embodiment corresponds to the method embodiment shown in FIG. 2. The various implementation processes and implementations of the above method embodiments may be applied to the first communication device embodiment and can achieve the same technical effects.

In an implementation where the network side device is a second communication device, the communication interface is configured to acquire second information, and the second information includes at least one of the following: first information and first policy information; and the processor is configured to execute a second operation according to the second information, the second operation including at least one of the following:

determining a first rule for data processing; and controlling the communication interface to send the first information or the first rule for data processing, the first rule for data processing being used for performing data passing related control on first data and/or second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

The second communication device embodiment corresponds to the method embodiment shown in FIG. 3. The various implementation processes and implementations of the above method embodiments may be applied to the second communication device embodiment and can achieve the same technical effects.

In an implementation where the network side device is a third communication device, the communication interface is configured to acquire third information, and the third information includes at least one of the following: first information and a first rule for data processing; and the processor is configured to execute a third operation according to the third information, the third operation including at least one of the following:

determining the first rule for data processing according to the first information; and performing data passing related control on first data and/or second data according to the received or determined first rule for data processing, the first rule for data processing being used for performing data passing related control on the first data and/or the second data;

the first data including at least one of the following: data related to a domain name server address and data related to a configuration server address;

the second data including at least one of the following: data independent of the domain name server address, data independent of the configuration server address, and/or non-first data; and the first information including at least one of the following: domain name server address information and configuration server address information.

The third communication device embodiment corresponds to the method embodiment shown in FIG. 4. The various implementation processes and implementations of the above method embodiments may be applied to the third communication device embodiment and can achieve the same technical effects.

Figure 13:
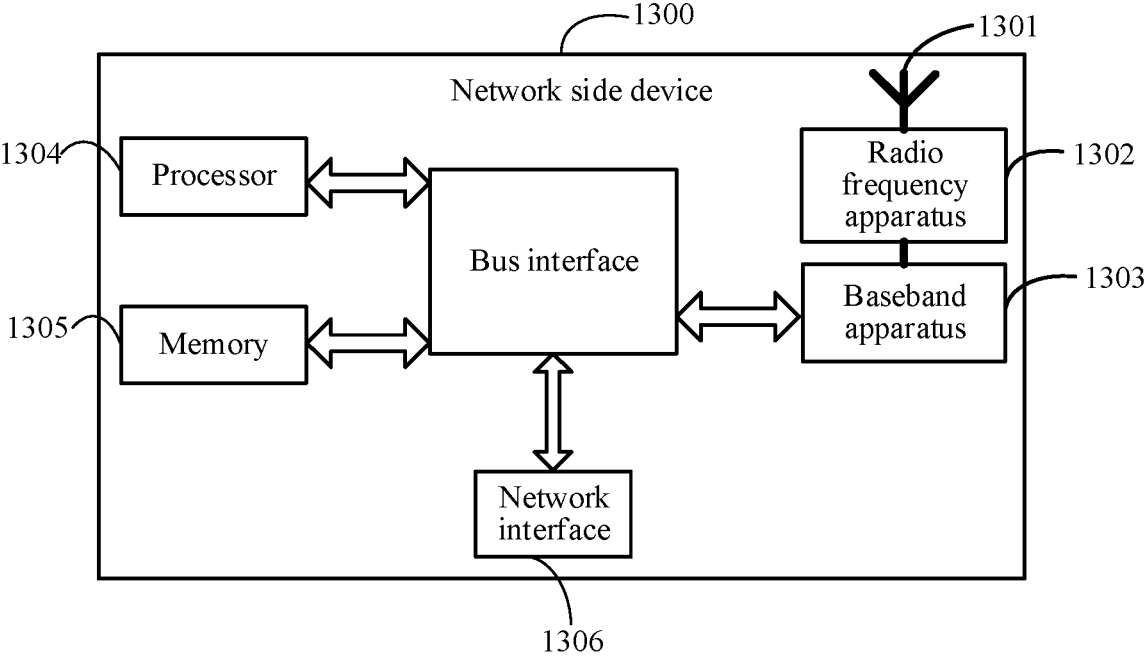
FIG. 13 is a structural diagram of a network side device provided in an embodiment of this application.

Specifically, an embodiment of this application provides a network side device. As shown in FIG. 13, the network device 1300 includes: antenna 1301, a radio frequency apparatus 1302, and a baseband apparatus 1303. The antenna 1301 is connected with the radio frequency apparatus 1302. In an uplink direction, the radio frequency apparatus 1302 receives information through the antenna 1301 and sends the received information to the baseband apparatus 1303 for processing. In a downlink direction, the baseband apparatus 1303 processes the information to be sent and sends the same to the radio frequency apparatus 1302. The radio frequency apparatus 1302 processes the received information and sends the same out through the antenna 1301.

The above frequency band processing apparatus may be located in the baseband apparatus 1303, the method executed by the network side device in the above embodiment may be implemented in the baseband apparatus 1303, and the baseband apparatus 1303 includes a processor 1304 and a memory 1305.

The baseband apparatus 1303 may, for example, include at least one baseband board, a plurality of chips are arranged on the baseband board, as shown in FIG. 13, and one of the chips, for example, is the processor 1304, connected with the memory 1305 to call a program in the memory 1305 and execute a network device operation shown in the above method embodiment.

The baseband apparatus 1303 may further include a network interface 1306 for exchanging information with the radio frequency apparatus 1302, and the interface is, for example, a common public radio interface (CPRI).

Specifically, the network side device according to this embodiment of this application further includes: an instruction or program stored on the memory 1305 and capable of being run on the processor 1304, where the processor 1304 calls the instruction or program in the memory 1305 to execute the method executed by each module shown in FIG. 7, FIG. 8, or FIG. 9, and achieves the same technical effects, which will not be repeated here to avoid repetition.

An embodiment of this application further provides a readable storage medium, storing a program or instruction, the program or instruction, when executed by a processor, implementing various processes of the above information processing method, configuration method or data control method embodiment and being capable of achieving the same technical effects, which is not repeated here to avoid repetition.

The processor is a processor in the terminal in the above embodiment. The readable storage medium includes a computer-readable storage medium, such as a computer read-only memory (ROM), a random access memory (RAM), a magnetic disk, or an optical disc.

An embodiment of this application provides another chip, the chip includes a processor and a communication interface, the communication interface is coupled with the processor, the processor is used for running a program or an instruction to implement various processes of the above information processing method, configuration method or data control method embodiment and be capable of achieving the same technical effects, which is not repeated here to avoid repetition.

It is to be understood that the chip mentioned in this embodiment of this application may further be referred to as a system level chip, a system chip, a chip system, or a system on chip.

It is to be noted that, terms "including", "containing", or any other variations are intended to cover non-exclusive inclusion, such that a process, method, item or apparatus that includes a series of elements not only includes those elements, but also other elements that are not explicitly listed, or further include elements inherent in such the process, method, item or apparatus. Without more limitations, elements defined by a statement "including one" do not exclude the existence of other identical elements in the process, method, item or apparatus that includes the said elements. In addition, it needs to be pointed out that the scope of the methods and apparatuses in the implementations of this application is not limited to performing functions in an order shown or discussed, but may further include performing functions in a substantially simultaneous mode or in an opposite order according to the involved functions. For example, the described methods may be executed in a different order from the described ones, and various steps may also be added, omitted, or combined. In addition, features described with reference to certain examples may be combined in other examples.

According to the descriptions in the foregoing implementations, those skilled in the art may clearly learn that the method according to the above embodiment may be implemented by relying on software and a commodity hardware platform or by using hardware. However, in many cases, the former is the better implementation. Based on such an understanding, the technical solutions of this application essentially, or the part contributing to the prior art, may be presented in the form of a computer software product. The computer software product is stored in a storage medium (such as an ROM/RAM, a magnetic disk, or an optical disc) including several instructions to enable a terminal (which may be a mobile phone, a computer, a server, an air conditioner, a network device, or the like) to execute the methods described in all the embodiments of this application.

The embodiments of this application have been described above with reference to the accompanying drawings. However, this application is not limited to the above specific implementations, and the above specific implementations are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. An information processing method, performed by a first communication device which includes a Policy Control Function (PCF), and comprising:

acquiring first information, the first information comprising domain name server address information, or the first information comprising domain name server address information and configuration server address information; and executing a first operation according to the first information; the first operation comprising:

determining first policy information; and sending the first policy information to a second communication device which includes a session management function (SMF), wherein the first policy information comprises relevant policy information requiring to execute an operation of allowing the first data to pass through;

the first data comprises data related to a domain name server address, or the first data comprises data related to a domain name server address and data related to a configuration server address; and the data related to the domain name server address comprises data with a destination address or source address being an address of a domain name server, or data with a destination or source being the domain name server;

the data related to the configuration server address comprises data with a destination address or source address being an address of a configuration server, or data with a destination or source being the configuration server.

2. The information processing method according to claim 1, wherein the first policy information further comprises:

relevant policy information requiring to execute a control operation of not allowing a second data to pass through or discarding the second data; wherein the second data comprises at least one of the following: data independent of the domain name server address, data independent of a provisioning server address, or non first data; the data independent of the domain name server address comprises data with a source address or destination address being not the domain name server address; the data independent of the provisioning server address comprises data with a source address or destination address being not the provisioning server address.

3. The information processing method according to claim 1, wherein the first policy information is used for determining a first rule for data processing, and the first rule for data processing comprises at least one of the following:

executing an operation of allowing the first data to pass through; or executing an operation of not allowing the second data to pass through or discarding the second data.

4. The information processing method according to claim 1, wherein the first policy information contains the first information.

5. The information processing method according to claim 1, wherein executing the first operation according to the first information comprises:

executing, in a case of confirming that a terminal accesses a first network through a first access mode, the first operation according to the first information, the first access mode comprising at least one of the following: an access mode of accessing a network for acquiring a certificate and/or subscription, an access mode using a restricted access network, an access mode of accessing the network by using a default certificate, an access mode capable of only establishing a restricted data tunnel, or an access mode incapable of establishing a non-restricted data tunnel.

6. The information processing method according to claim 1, wherein the domain name server address information comprises the domain name server address; and the con-figuration server address information comprises a provisioning server (PVS) address.

7. The information processing method according to claim 1, wherein the first policy information is policy information used for at least one of the following: a data tunnel for user plane based credential configuration, or a data tunnel for onboarding.

8. An information processing method, performed by a second communication device which includes a session management function (SMF), and comprising:

acquiring first policy information from a first communication device which includes a policy control function (PCF); wherein the first policy information comprises: relevant policy information requiring to execute an operation of allowing a first data to pass through; and executing a second operation according to the first policy information, the second operation comprising:

determining a first rule for data processing; and sending the first rule for data processing to a third communication device which includes a user plane function (UPF), wherein the first rule for data processing comprises: a rule for executing an operation of allowing the first data to pass through;

the first data comprises data related to a domain name server address, or the first data comprises data related to a domain name server address and data related to a configuration server address;

the data related to the domain name server address comprises data with a destination address or source address being an address of a domain name server, or data with a destination or source being the domain name server;

the data related to the configuration server address comprises data with a destination address or source address being an address of a configuration server, or data with a destination or source being the configuration server.

9. The information processing method according to claim 8, wherein the operation of determining the first rule for data processing comprises at least one of the following:

setting a data detection rule for the first data;

setting a data forwarding rule for the first data and allowing the first data to pass through;

setting the data forwarding rule for a second data, and not allowing the second data to pass through or discarding the second data; or not setting the data detection rule and/or the data forwarding rule for the second data.

10. The information processing method according to claim 8, wherein the first rule for data processing is at least related to address information of the domain name server.

11. The information processing method according to claim 10, wherein the first rule for data processing is further related to address information of a provisioning server, and is used for executing a data passing operation on data related to provisioning server query.

12. The information processing method according to claim 8, wherein the first rule for data processing further comprises:

executing an operation of not allowing a second data to pass through or discarding the second data;

wherein the second data comprises at least one of the following: data independent of the domain name server address, data independent of a provisioning server address, or non first data; the data independent of the domain name server address comprises data with a source address or destination address being not the domain name server address; the data independent of the provisioning server address comprises data with a source address or destination address being not the provisioning server address.

13. The information processing method according to claim 8, wherein the domain name server address information comprises a domain name server address; and the configuration server address information comprises a provisioning server (PVS) address.

14. The information processing method according to claim 8, wherein executing the second operation according to the first policy information comprises:

executing, in a case of confirming that a terminal accesses a first network through a first access mode, the second operation according to the first policy information, the first access mode comprising at least one of the following: an access mode of accessing a network for acquiring a certificate and/or subscription, an access mode using a restricted access network, an access mode of accessing the network by using a default certificate, an access mode capable of only establishing a restricted data tunnel, or an access mode incapable of establishing a non-restricted data tunnel.

15. The information processing method according to claim 8, wherein the first rule for data processing comprises at least one of a packet detection rule (PDR) or a forwarding action rule (FAR).

16. An information processing method, performed by a third communication device which includes a user plane function (UPF), and comprising:

acquiring a first rule for data processing sent from a second communication device which includes a session management function (SMF); wherein the first rule for data processing comprises: a rule for executing an operation of allowing the first data to pass through; and executing a third operation according to the first rule for data processing, the third operation comprising:

performing data passing related control on first data according to the first rule for data processing, wherein the first data comprises data related to the domain name server address, or, the first data comprising data related to a domain name server address and data related to a configuration server address;

the data related to the domain name server address comprises data with a destination address or source address being an address of a domain name server, or data with a destination or source being the domain name server;

the data related to the configuration server address comprises data with a destination address or source address being an address of a configuration server, or data with a destination or source being the configuration server.

17. The information processing method according to claim 16, wherein the first rule for data processing further comprises:

executing an operation of not allowing a second data to pass through or discarding the second data; wherein the second data comprises at least one of the following: data independent of the domain name server address, data independent of a provisioning server address, or non first data; the data independent of the domain name server address comprises data with a source address or destination address being not the domain name server address; the data independent of the provisioning server address comprises data with a source address or destination address being not the provisioning server address.

18. The information processing method according to claim 16, wherein acquiring a first rule for data processing comprises: acquiring the first rule for data processing in a case of confirming that a terminal accesses a first network through a first access mode, the first access mode comprising at least one of the following: an access mode of accessing a network for acquiring a certificate and/or subscription, an access mode using a restricted access network, an access mode of accessing the network by using a default certificate, an access mode capable of only establishing a restricted data tunnel, or an access mode incapable of establishing a non-restricted data tunnel.

19. The information processing method according to claim 16, wherein the domain name server address information comprises a domain name server address; and the configuration server address information comprises a provisioning server (PVS) address.

20. The information processing method according to claim 16, wherein the performing data passing related control on first data according to the first rule for data processing comprises at least one of the following:

allowing data related to domain name query carried by a restricted protocol data unit (PDU) session to pass through; or allowing data related to configuration query carried by the restricted PDU session to pass through.

* * * * *